United States Patent [19]

Sobolev

[11] Patent Number: 5,030,488

[45] Date of Patent: Jul. 9, 1991

[54] LAMINATES, PANELS AND MEANS FOR JOINING THEM

[75] Inventor: Igor Sobolev, Orinda, Calif.

[73] Assignee: Chemical and Polymer Technology, Inc., Orinda, Calif.

[21] Appl. No.: 276,406

[22] Filed: Nov. 23, 1988

[51] Int. Cl.$^5$ .................................................. B32B 15/04
[52] U.S. Cl. ............................................... 428/35.9
[58] Field of Search .............. 428/457, 458, 461, 463, 428/215, 213, 212, 216, 35.9, 460, 464, 469, 337, 109; 156/79, 199, 244.27, 313, 283; 52/272; 296/181, 187; 220/1.5, 450; 280/415.1; 272/3; 148/265; 524/3

[56] References Cited

U.S. PATENT DOCUMENTS

| | | | |
|---|---|---|---|
| 2,226,589 | 12/1940 | Smyers | 428/461 |
| 2,711,380 | 6/1955 | Pintell | 428/460 |
| 2,730,772 | 1/1956 | Jones | 52/272 |
| 3,298,559 | 1/1967 | Lurie | 220/450 |
| 3,317,219 | 5/1967 | Hinden et al. | 280/415.1 |
| 3,363,231 | 1/1968 | Grosgebauer et al. | 296/181 X |
| 3,382,136 | 5/1968 | Bugel et al. | 428/457 X |
| 3,392,045 | 7/1968 | Holub | 428/461 X |
| 3,455,775 | 7/1969 | Pohl et al. | 428/461 |
| 3,467,569 | 9/1969 | Weber et al. | 428/463 |
| 3,481,642 | 12/1969 | Bonallack et al. | 296/187 |
| 3,499,819 | 3/1970 | Lewis | 428/461 X |
| 3,542,605 | 11/1970 | Harvey | 148/265 |
| 3,560,285 | 2/1971 | Schroter et al. | 156/79 |
| 3,582,427 | 6/1971 | Bacskai | 156/283 |
| 3,594,249 | 7/1971 | Mueller-Tamm et al. | 156/199 |
| 3,616,019 | 11/1971 | Mueller-Tamm et al. | 156/244.27 |
| 3,623,943 | 11/1971 | Altenpohl et al. | 428/465 X |
| 3,655,504 | 4/1972 | Mueller-Tamm et al. | 428/215 |
| 3,711,365 | 1/1973 | Pyle | 428/461 |
| 3,721,597 | 3/1973 | Colburn | 156/313 |
| 3,952,136 | 4/1976 | Yoshikawa et al. | 428/463 |

(List continued on next page.)

FOREIGN PATENT DOCUMENTS

| | | |
|---|---|---|
| 1238349 | 6/1962 | Fed. Rep. of Germany . |
| 2712977 | 3/1977 | Fed. Rep. of Germany . |
| 1414949 | 9/1965 | France . |
| 1469545 | 1/1967 | France . |
| 635823 | 4/1950 | United Kingdom . |

OTHER PUBLICATIONS

Pennington, N., "Thick Aluminum Sheet Helps Trucks Haul More Light Cargo", Modern Metals, Nov. 1986, pp. 20-25.

Vogelesang, L., "Development of a New Hybrid Material (ARALL) for Aircraft Structure", Ind. Eng. Chem. Prod. Res. Dev., 1983, pp. 492-496.

Adhesive Bonding of Aluminum Alloys, Thrall & Shannon, Ed., Marcel Decker NY(1985); Marceau, J. Arthur, Chapter 4, "Phosphoric Acid Anodize", pp. 51-73.

Kuenzi, Edward W., "Structural Sandwich Design Criteria", pp. 9-18, Publication 798, National Academy of Sciences-National Research Council, Washington, D.C. (1960).

"The Basics on Bonded Sandwich Construction", TSB124, Hexcel, Dublin, CA (1986).

*Primary Examiner*—Thomas J. Herbert
*Attorney, Agent, or Firm*—Burns, Doane, Swecker and Mathis

[57] ABSTRACT

Sandwich panels, i.e., laminates which comprise two metal sheets with a filled, reinforced resin core between and bonded to the metal sheets, are useful for structural and other uses. Combinations of metal sheets, resins, fillers, and reinforcement bonded together in the sandwich structure provided a laminate having a flexural modulus of at least 2.5 million psi, a rigidity index of at least about 2,000 and other unique properties which enable the laminates to be particularly useful for thin wall truck trailer body construction, as well as other uses. A rigidity index and a falling ball impact test for sandwich structures and panels are used to characterize the properties of these sandwich laminates. Methods of making the above sandwich laminates and means for joining the sandwich laminates and panels are disclosed, which provide for their particular usefulness in truck trailer body construction, as well as other structural and non-structural uses.

44 Claims, 10 Drawing Sheets

U.S. PATENT DOCUMENTS

| | | | |
|---|---|---|---|
| 4,068,840 | 1/1978 | Spaulding, Jr. | 272/3 |
| 4,085,012 | 4/1978 | Marceau et al. | 428/469 X |
| 4,127,451 | 11/1978 | Marceau et al. | 428/469 X |
| 4,204,022 | 5/1980 | Snyder et al. | 428/337 |
| 4,212,405 | 7/1980 | Schmidt | 220/1.5 |
| 4,229,504 | 10/1980 | Brachman | 428/461 |
| 4,313,996 | 2/1982 | Newman et al. | 428/215 |
| 4,330,587 | 5/1982 | Woodbrey | 428/215 |
| 4,341,878 | 7/1982 | Marcantonio et al. | 524/3 |
| 4,369,222 | 1/1983 | Hedrick et al. | 428/216 |
| 4,416,949 | 11/1983 | Gabellieri et al. | 428/463 X |
| 4,421,827 | 12/1983 | Phillips | 428/458 X |
| 4,424,254 | 1/1984 | Hedrick et al. | 428/215 |
| 4,477,513 | 10/1984 | Koga | 428/461 X |
| 4,482,589 | 11/1984 | Widman | 428/35.9 |
| 4,489,123 | 12/1984 | Schijve et al. | 428/213 |
| 4,500,589 | 2/1985 | Schijve et al. | 428/213 |
| 4,592,585 | 6/1986 | Oren et al. | 296/181 |
| 4,594,292 | 6/1986 | Nagai et al. | 428/463 X |
| 4,601,194 | 7/1986 | Lutz et al. | 428/213 |
| 4,685,721 | 8/1987 | Banerjea | 296/181 |
| 4,707,397 | 11/1987 | Morimura et al. | 428/216 |
| 4,743,485 | 5/1988 | Ting | 428/109 |
| 4,748,072 | 5/1988 | Schobermayr | 428/212 |
| 4,759,964 | 7/1988 | Fischer et al. | 428/116 |

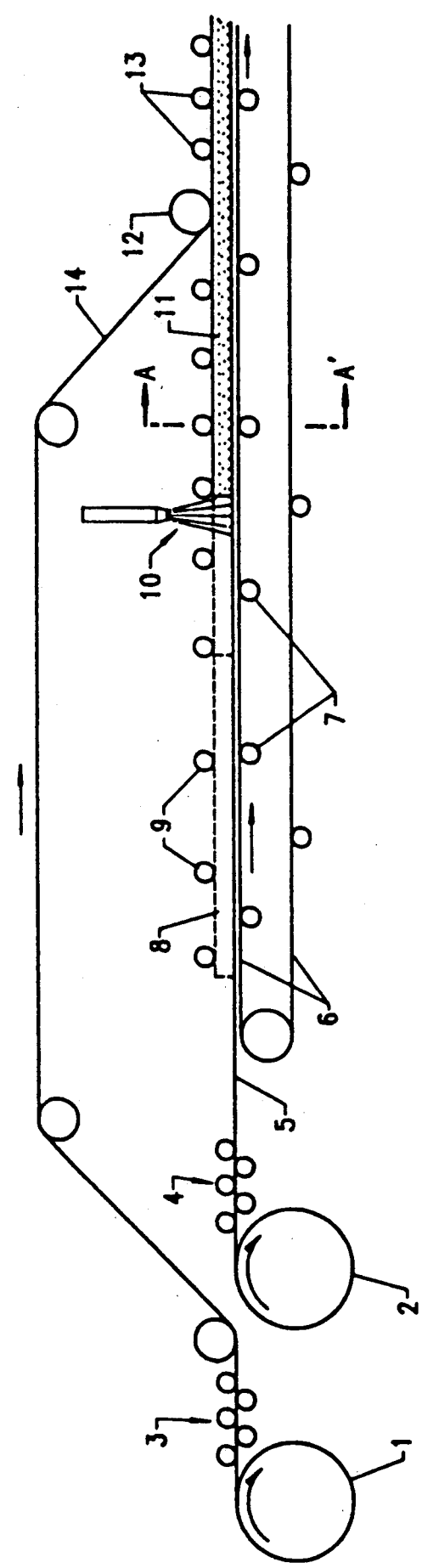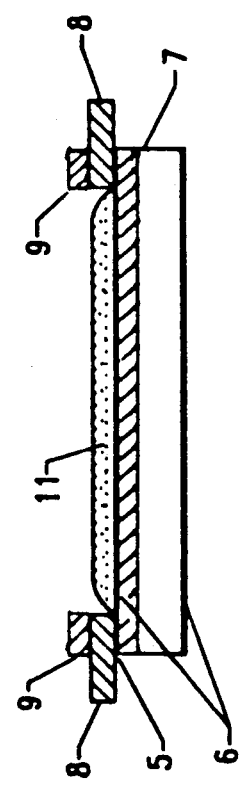
FIG. 1A
FIG. 1B

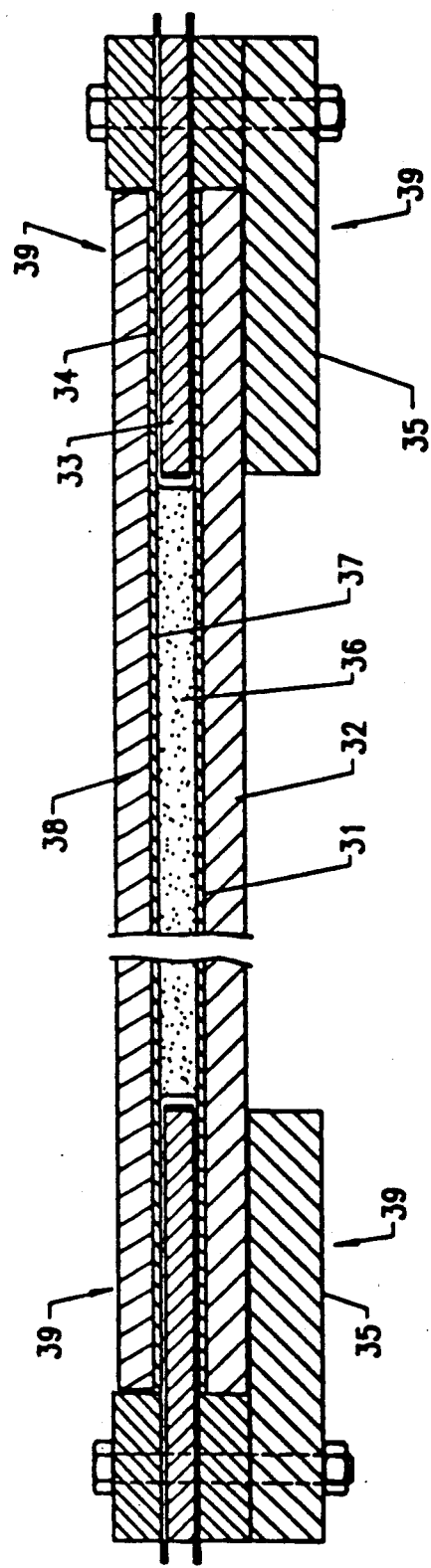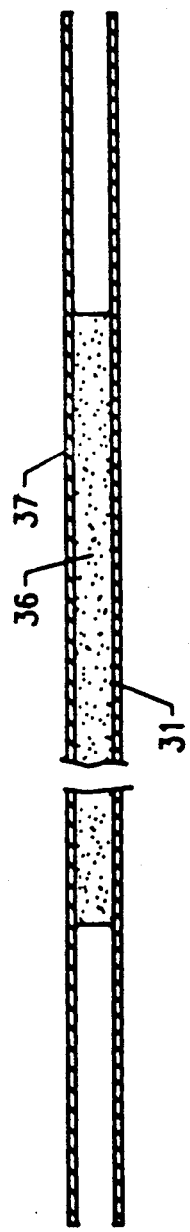

LAMINATES, PANELS AND MEANS FOR JOINING THEM

FIELD OF THE INVENTION

This invention relates to the field of structural laminates, and in particular to a sandwich laminates comprising two metal sheets and a resin core. This invention also relates to the field of trailer body construction.

BACKGROUND OF THE INVENTION

This invention relates to structural laminates which comprise two metal sheets or two metal skin layers with a polymer core disposed between and attached to each of the inside surfaces of the metal sheets. The laminates of this invention have improved structural strength compared to prior laminates of this type. The laminates of this invention are also useful in decorative and protective applications as well as structural applications.

In the field of laminates, metal-resin-metal laminates are disclosed in U.S. Pat. Nos. 4,313,996 to Newman, et al. and 4,601,941 to Lutz, et al. Additional laminates are disclosed in U.S. Pat. Nos. 3,382,136 to Bugel, et al., 3,392,045 to Holub, 3,455,775 to Pohl, et al., 3,594,249 to Mueller-Tamm, et al., 3,623,943 to Altenpohl, et al., 3,655,504 to Mueller-Tamm, et al., 3,952,136 to Yoshikawa, et al., 4,330,587 to Woodbrey, 4,416,949 to Gabellieri, et al., 4,477,513 to Koga, and 4,594,292 to Nagai, et al. In these references, a property which is generally important is that the laminates be formable, particularly thermoformable. Other properties which have been important for metal-resin-metal laminates have been the resistance of the metal skin to heat, weather, chemicals and impact, as well as the metal skin's hardness, impermeability and strength. Multi-layer laminates have been made with multiple, alternating layers of resin and metal. Laminates in this field have been used also for heat insulation and vibration damping.

In U.S. Pat. No. 3,499,819 to Lewis, the resin core is a polypropylene which contains a foaming agent additive to cause the polypropylene to form a foam between the metal layers. In U.S. Pat. No. 3,560,285 to Schroter, et al. a mixture of polyether polyols is foamed with polyisocyanates to form foamed urethane cores between metal layers. U.S. Pat. No. 4,421,827 to Phillips discloses metal-clad articles which use a combination of thermosetting resins and particular adhesives to bond a resin layer to a metal facing.

As disclosed by Vogelesang (Ind. Eng. Chem. Prod. Res. Dev. 1983, 22, 492-496) aluminum laminates with high tensile strength and fatigue resistance have also been made with multiple core layers of aramid fiber-reinforced epoxy resins. These aluminum laminates, known as "ARALL" laminates, have been developed for use as aircraft skins. See also U.S. Pat. Nos. 4,489,123 and 4,500,589 to Schijve, et al.

While metal-resin-metal laminates have been used in trailer bodies, such laminates have not been used for structural members. Examples of such non-structural laminates are sandwich structures which have been used for thermal insulation in trailer bodies, as shown in U.S. Pat. No. 3,363,231 to Grosgebauer, et al., and 4,482,589 to Widman. In U.S. Pat. 2,730,722 to Jones, a metal-resin-plywood laminate is disclosed that is both insulative and structural, but is over 2 inches (5 cm) thick. Thermal insulation panels usually have very low density cores, i.e., specific gravities in the range of 0.10 or less, and thus a low shear modulus and low impact resistance.

For trucks operated on public highways, U.S. federal law now limits the exterior width of trailers to 102.38 inches (260 cm). Therefore, interior space can be increased if the thickness of the walls of the trailer body can be decreased. This is particularly important in industries transporting light, bulky loads, such as empty beverage cans, where the volume of the trailer is often more limiting than the weight of the load. Thus, emphasis in this field is on designing trailers for maximum interior usable width. Also, because of the dimensions of standard pallets, it is desirable that the interior width of the trailer be at least 101 inches (256.5 cm). The advantages of having thin walls and the additional interior space provided by a thin-wall trailer construction are discussed by Pennington, *Modern Metals*, Nov., 1986, pp. 20-25.

In order to achieve the desired interior width dimension of at least 101 inches (256.5 cm), each sidewall of the trailer body can be no thicker than 0.69 inches (1.75 cm). The sheet and post trailers, the most common type, follow a truss design which generally uses about 0.045 inch (0.114 cm) or 0.050 inch (0.127 cm) aluminum sheet riveted to steel or aluminum frame and posts. The sheet and post trailer has an overall wall thickness of 1.4 inches (3.56 cm) to 1.7 inches (4.32 cm) and a maximum interior width of 99.58 inches (252.9 cm) to 99 inches (251.4 cm). Conventional trailer bodies made with resin-fiberglass-plywood laminates use either 0.625 inch (1.6 cm) or 0.75 inch (1.9 cm) plywood as the core, resulting in an overall thickness of up to 0.86 inches (2.18 cm) even in a post-free design using that type of panel.

In U.S. Pat. No. 4,212,405 to Schmidt there is disclosed a trailer having a "box" type of design using unitary aluminum alloy plates as the walls and supporting structure in a frameless trailer body. This structure is intended to provide an interior trailer dimension of at least 101.5 inches (257.8 cm). While this configuration provides the desired wall thickness of down to about 0.156 inch (0.4 cm), but usually about 0.25 inch (0.6 cm), a trailer made of the aluminum alloy plate is much heavier than desired. There are other disadvantages, as well, in having a trailer wall made of a unitary aluminum alloy plate. Since these plates are typically a single 9 ft. (2.74 m) by 44 ft. (13.41 m) rigid plate, there are associated problems in manufacturing, shipping and handling of the plates, as well as in assembling and repairing the trailer. It is particularly difficult to repair these trailers without losing interior space and without either decreasing wall thickness or, if the damage is repaired by welding, without loss of strength.

In order to overcome these disadvantages, Banerjea discloses an alternative trailer construction having a box type design in U.S. Pat. No. 4,685,721. This trailer body construction uses smaller sized individual plates spliced together with joining panels and stiffener panels designed to be riveted with the aluminum sheets to keep the wall thickness to a minimum. Since the additional splices add undesired weight, some of the panels or sheets are thinner in lower stress areas than in higher stress areas in order to partially compensate for the added weight from the splices and joining panels. The overall result, however, is a trailer that is still heavier than desired and the interior width of which is less than desired because of the splices and rivets.

The disclosures of the above references are incorporated herein by reference.

OBJECTS OF THE INVENTION

I have determined that it would be desirable to use sandwich panels as structural elements in trailer construction. This invention provides laminates which have improved structural and strength properties and which are useful as structural components in trailer body construction to accomplish the desired lighter weight, thinner wall construction.

As used herein, the term "sandwich" is used to refer to metal-resin-metal laminate structures.

I have also determined that it would be desirable to construct and use structural laminates which have a high rigidity index, which is the ratio of rigidity to the product of basis weight (weight per unit area) and thickness. The factors desired for a high rigidity index are thus high rigidity, low basis weight and low laminate thickness.

It is an object of this invention to provide improved wall and structural panel materials, which is accomplished by the metal-resin-metal laminates of this invention having improved structural properties, in particular vertical and longitudinal stiffness. This invention provides such laminates which have reduced thickness and weight, while still providing desired load bearing capacity, improved resistance to buckling under load, improved impact resistance and improved resistance to delamination.

Another object of this invention is to provide a wall panel having sufficient stiffness and other structural properties to enable the construction of trailer bodies having a wall thickness of about 0.6 inches (1.52 cm) or less, including rivet heads, to provide an interior width of the trailer of not less than about 101 inches (256.5 cm) without exceeding the maximum outside width of 102.38 inches (260 cm). The laminate of this invention is a wall panel which meets these requirements.

It is another object of this invention to provide the above trailer construction which is lighter in weight than the unitary aluminum alloy plate trailer construction. It has been found that the structural laminate of this invention can provide side wall weight that is in the range of 20% to 30% less than typical monolithic aluminum plate construction.

The above objects with respect to the structural laminates of this invention and particularly with respect to trailer construction using these laminates will be apparent to those skilled in the art from the following description and from the use of the laminates of this invention. Other uses and advantages of the laminates of this invention will also be apparent to those skilled in the art, such as in construction of freight container bodies, including intermodal (ocean, truck, rail) freight cargo containers, truck trailer bodies and freight containers for aircraft; residential trailers, mobile homes, recreational vehicles, collapsible and portable buildings, flooring for buses and other vehicles, exterior building and architectural panels, concrete pouring forms, including any of these or other uses where metal-covered plywood has been used.

SUMMARY OF THE INVENTION

In one aspect the structural laminate of this invention comprises two metal sheets and a reinforced resin core between and bonded to the metal sheets, wherein each metal sheet has a thickness between about 0.015 inch (0.038 cm) and about 0.1 inch (0.25 cm), and the total thickness of the laminate is between about 0.1 inch (0.25 cm) and about 2 inches (5 cm), wherein the laminate is characterized by having a flexural modulus, as described herein, of at least about $2.5 \times 10^6$ psi (about $17.24 \times 10^3$ MPa).

In another aspect the structural laminate of this invention comprises two metal sheets and a reinforced resin core between and bonded to the two metal sheets, wherein each metal sheet has a thickness between about 0.015 inch (0.038 cm) and about 0.1 inch (0.25 cm), and the thickness of the laminate is between about 0.1 inch (0.25 cm) and 2 inches (5 cm), wherein the laminate is characterized by having a rigidity index, described herein, of at least about 2000.

In another aspect the structural laminate of this invention comprises two metal sheets and a reinforced resin core between and bonded to the two metal sheets, wherein each metal sheet has a thickness between about 0.015 inch (0.038 cm) and about 0.1 inch (0.25 cm), and the thickness of the laminate is between about 0.1 inch (0.25 cm) and 2 inches (5 cm), wherein the laminate is characterized by having an impact resistance sufficient to pass the falling ball impact test, as described herein.

In another aspect the structural laminate of this invention comprises two metal sheets and a reinforced resin core between and bonded to the two metal sheets, wherein each metal sheet has a thickness between about 0.015 inch (0.038 cm) and about 0.1 inch (0.25 cm) and a tensile (Young's) modulus of at least $9 \times 10^6$ psi, and the thickness of the laminate is between about 0.1 inch (0.25 cm) and 2 inches (5 cm), wherein the laminate is characterized by the core having a shear modulus of at least 40,000 psi, determined as described herein, and wherein the resin from which the core is made exhibits a neat resin to metal bond having a lap shear strength of at least 1,000 psi.

In another aspect the structural laminate of this invention comprises two metal sheets and a reinforced resin core between and bonded to the two metal sheets, wherein each metal sheet has a thickness between 0.015 inch (0.038 cm) and about 0.1 inch (0.25 cm), the thickness of the laminate is between about 0.1 inch (0.25 cm) and about 2 inches (5 cm), and the resin core is a conventional or syntactic foam (containing microballoons) so that the weight of the laminate is less than about 3.5 lb./ft.$^2$ (17.1 kg/m$^2$).

In another aspect the structural laminate of this invention comprises two metal sheets and a reinforced resin core between and bonded to the two metal sheets, wherein the metal sheet has a thickness between about 0.015 inch (0.038 cm) and about 0.10 inch (0.25 cm), and wherein the resin core comprises a thermoset resin and is either a conventional or syntactic foam (containing microballoons) so that the specific gravity of the fiber-reinforced resin core when cured is between about 0.7 and about 1.3.

In another aspect the process of this invention comprises placing between two metal sheets having prepared surfaces, a resin composition comprising (a) thermoset resin capable of bonding to the prepared surfaces of the metal sheets upon curing to provide a lap shear strength of at least 500 psi, (b) reinforcing material present in an amount between about 3 and about 30 parts by weight based upon the weight of the resin, and (c) microballoons in suspension in the resin present in an amount sufficient to provide the cured reinforced resin composition a specific gravity less than about 1.4, and curing the resin composition while positioned between and in contact with the two metal sheets.

In another aspect this invention comprises a trailer body comprising at least one panel in the structure thereof which is a structural laminate comprising two metal sheets and a reinforced resin core between and bonded to the two metal sheets, wherein each metal sheet has a thickness between 0.015 inch (0.038 cm) and about 0.1 inch (0.25 cm), the thickness of the laminate is between about 0.15 inch (0.38 cm) and about 2 inches (5 cm), and the resin core is a conventional or a syntactic foam (containing microballoons) so that the weight of the laminate is less than about 3 lb./ft.$^2$.

In another aspect this invention comprises an assembly comprising substantially abutting sandwich panels each having recessed cores along the length of one edge thereof;

internal splice sections, each of which is positioned in the recessed area between the metal sheets, each of which extends substantially from the recessed resin core in the first panel to the recessed resin core in the second panel, each of which are shorter in length than the length of said edge, and each of which overlap another splice section; and means for attaching each splice section to a metal sheet of at least two abutting panels and to at least one other splice section overlapping therewith.

BRIEF DESCRIPTION OF THE DRAWINGS

FIGS. 1a and 1b are schematic diagrams of a continuous process for laminate manufacture showing, respectively, a side view and a cross section view.

FIG. 3a is a cross section end view of a laminate panel in the assembly frame used to batch manufacture the laminate panels.

FIG. 3b is a cross section end view of a laminate panel with a recessed core.

DESCRIPTION OF THE INVENTION

Figure 2:
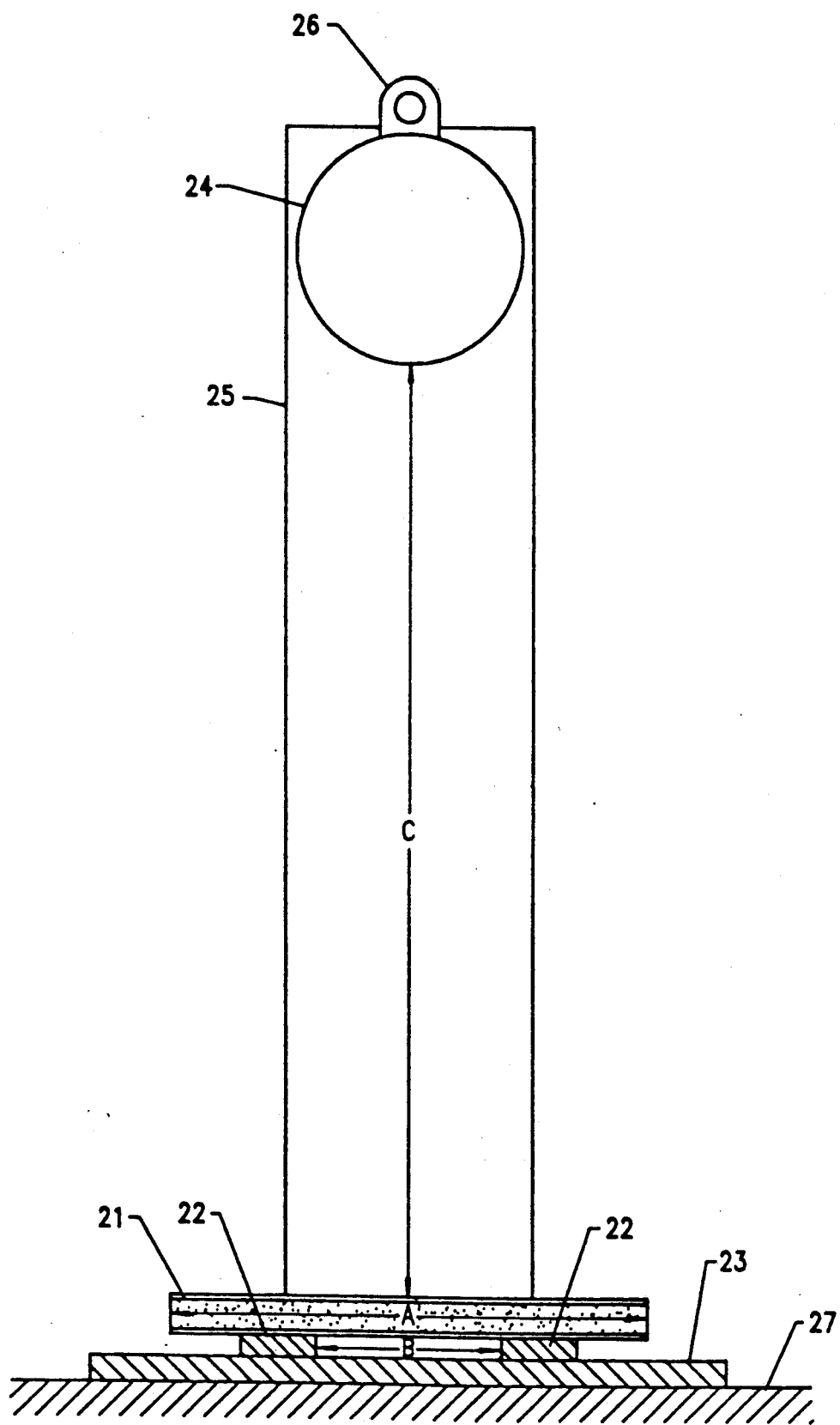
FIG. 2 is a diagram of the Falling Ball Impact Resistance Test apparatus.

The high structural performance of the laminates of this invention is due to a very rigid polymer core, i.e., one with a high shear modulus, and a strong bond of that core to the metal facings. Of almost equal importance for the preferred laminates of the present invention is the impact resistance of the core and the core-to-metal bond. These unique properties and characteristics of the laminates of this invention are described below.

As an illustration of one embodiment of this invention, the following Table A is provided to show comparison of the laminate of the present invention to typical values for other materials in the construction of a typical trailer 48 ft. (14.6 m) in length. A unitary aluminum plate type trailer is disclosed in Schmidt U.S. Pat. No. 4,212,405 and the plate type trailer with external splices is disclosed in Banerjea U.S. Pat. No. 4,658,721. As shown in Table A, the laminates of this invention provide about the same interior width as the unitary plate but at considerably less weight. The laminates of this invention will provide an average trailer wall weight (including splices and posts) of about 2.6 lb/ft$^2$ compared to 3.4 to 3.6 lb/ft$^2$ for the plate construction using the lighter weight panels of this invention results in about 1,000 lb. less weight in the overall construction of a 48 ft. trailer. The laminates of this invention are lighter in weight than the ¾ inch plywood generally used in trailers designed for heavy duty hauling and are at least as light weight as the ⅝ inch plywood construction, but the laminates of this invention are stronger than both. Trailer designs based on the laminates of this invention provide more interior trailer width than plywood construction because of the thinner wall construction which results from the laminate of this invention. Plus, the panels of this invention do not lose strength in high humidity conditions, as do the FRP plywood panels. In addition, the cost of the laminate of this invention in such trailer construction is considerably less than that of the metal plate in the unitary plate trailer.

TABLE A

VAN TRAILER FEATURES
(Values typical for 48-ft. length)

| | Trailer type | | | | |
|---|---|---|---|---|---|
| | Post & sheet | FRP | Unitary Aluminum Plate | Plate with Splices | Laminate of This Invention |
| Design type | Truss | Box | Box | Box | Box |
| Support posts | Yes | No | No | No | No |
| Vertical splices | No | No | No | External | Internal |
| Panel size, ft. | 4 × 9<br>2 × 9 | 9 × 48 | 9 × 48 | 4 × 9<br>2 × 9 | 4 × 9<br>(2 × 9) |
| Panel material | Aluminum | Fiberglass-reinforced resin-faced plywood | Aluminum | Aluminum | Aluminum-faced laminate |
| Panel thickness, in. | 0.050 | 0.65–0.80 | 0.25 | 0.19–0.25 | 0.31 |
| Interior scuff strip | Plywood | Plastic | None | None | None |
| Total wall thickness, in. (incl. 0.13 or 0.25 in. for rivets) | 1.7 | 0.78–1.02 | 0.37 | 0.63–0.69 | 0.56 |
| Max interior width, in. | 99.0 | 100.32–100.72 | 101.62 | 101.04–101.10 | 101.24 |
| Ave. wall weight (incl. | 1.6± | 2.5–2.9 | 3.6 | 3.4 | 2.6 |

TABLE A-continued
VAN TRAILER FEATURES
(Values typical for 48-ft. length)

| | Trailer type | | | | |
|---|---|---|---|---|---|
| | Post & sheet | FRP | Unitary Aluminum Plate | Plate with Splices | Laminate of This Invention |
| posts & splices), lb./sq. ft. | | | | | |

The four basic elements present in the structural laminates of the present invention are (1) the metal sheets, (2) the resin or polymer core between the sheets and bonded to the inside surfaces of the sheets, (3) reinforcing material in the polymer or resin core which increases the strength properties of the resin core, and (4) a filler in the polymer or resin core to lower the density of the core, which filler can be a gas to foam the resin or is preferably microballoons which are gas filled. In addition to these essential elements, optional ingredients or optional resin properties can also be included in the polymer or resin core, such as flame retardants, viscosity modifiers, pigments, UV stabilizers, antioxidants, surfactants and other additives desired by one skilled in the art for the particular application in which the structural laminate of this invention is being used.

Preparation of the Laminate

The laminates of the present invention preferably are prepared by applying the liquid resin core mixture containing all necessary fillers, reinforcements and other additives to the interior surface of one of the metal facings, applying the second metal facing, and curing the resulting sandwich structure. The principal advantage of in situ curing of the liquid resin mixture over assembly of the laminate from a similar precured core material is simplicity and economy.

The laminates can be produced batchwise, i.e. from metal facings pre-cut approximately or exactly to the desired final panel size before fabrication, or they can be produced continuously from coiled metal sheet. In both types of processes, the bottom facing is first laid on a flat surface, and a means of preventing the liquid resin mixture from flowing over the edges is provided. A preferred method involves the use of removable spacers which are pressed down along the edges. These spacers determine core thickness and prevent liquid resin from exuding from the panel prior to cure.

The composition of the spacers can vary. If the spacers are to be re-used, and particularly if an edge with a recessed core is desired, a material that does not bond to the resin is used. An example of an effective reusable spacer of this type is a solid polypropylene bar, or a metal sheet covered with polypropylene. Other materials such as polyethylene (preferably of the linear type) or thermoplastic polyester such as Mylar(TM) sheet, may also be employed. As an example of non-reusable spacers, smoothly sanded plywood strips are quite effective. These become bonded to the resin, and the edge portion containing them can be sawed off after curing. Combinations of both reusable and non-reusable spacers can also be employed.

The key features of a continuous process are shown in FIGS. 1a and 1b. Metal sheet of the desired width from two coils 1 and 2 is passed through straightening rollers 3 and 4 to remove coil set. Sheet 5 for the bottom facing is then fed to a conveyor belt 6 or roller table, where it travels over supporting rollers 7. Spacers 8 are then applied to the two edges of sheet 5 and held down with moderate pressure using rollers 9. The spacers may consist of polypropylene-covered steel strips that are separate or linked together flexibly into a continuous loop. They are applied to the sheet and later removed after curing.

The liquid resin, catalyst or curing agent, filler, fiber reinforcement and any other desired additives are applied to the inner surface of the facing sheet 5 with a spray gun 10 (also known as a chopper gun). With this common device, liquid resin containing the filler is pumped to a discharge nozzle. Liquid catalyst or curing agent is injected just before discharge. The mixture is then sprayed onto the inside surface of the metal facing. A cutting unit and a compressed air nozzle, both of which are attached to the spray gun discharge cut fiberglass in the same direction as the resin. Commercial guns of this type allow the resin layer to be deposited to within 0.25 to 0.5 in. (6.3 to 12 mm) of the edge spacer with virtually no overspray.

With the concentrations of microballoons and chopped fiber preferred for the laminates of this invention, the mixture 11 deposited on the metal sheet is quite viscous, and there is no significant flow of liquid resin between the edge spacer and the bottom facing sheet. Uniform deposition on the moving sheet is achieved by having the spray head traverse back and forth across the width of sheet 5 on an automatic reciprocator unit. In some cases two or more such units may be needed. Reciprocating spray gun assemblies are commercially used in the manufacture of fiberglass sheets and panels. As indicated in cross section A—A' in FIG. 1b, the initial thickness of the deposited core mixture 11 is slightly greater than that of the edge spacers to allow some spreading of the mixture after the top facing sheet 14 is applied.

In tests with commercial airless medium-pressure spray equipment (500 to 700 psi at the pump discharge), the core mixture was deposited evenly and without any entrapped air. Any further compaction and smoothing of the deposited core layer with rollers was unnecessary.

Following the spray station, the top facing sheet 14 then passes under one or more rollers 12 that guide the straightened metal sheet from the coil 1 onto the resin mixture-covered bottom sheet. A series of rollers 13 exert moderate downward pressure across the width of the top sheet 14 so as to provide good contact of the top sheet 14 with the resin mixture 11 and with the spacers 8 at the edges. The deposited resin mixture 11 is spread out slightly under the applied pressure, filling the void at the edges left to avoid overspray.

The uncured laminate next passes into a curing oven (not shown in the Figure), where the laminate is brought to the desired temperature while still constrained by rollers above and below. Heating can be accomplished with infrared heaters, with hot air or by other desired means.

After the oven, the spacers, if removable, are separated from the cured laminate and returned to the front of the laminating unit. The laminate then enters the cutting station where, while still hot, it is cut to the desired length with a traversing saw or a high-pressure water jet. The hot panels may then be stacked in an insulated room to allow continuing the cure, or they may be stacked in the open and allowed to cool.

If desired, a paint station may be inserted in the above-described laminating line. Partially cured panels, even though still hot, are sufficiently rigid to be supported by the spacers projecting out from the side of the continuous laminate, allowing it to be roll- or spray-coated from either or both sides. After cutting, the painted panels can, if desired, be placed in an infrared or hot air baking oven to conclude the cure of the painted surface as well as of the core. Phoshoric acid-anodized aluminum surfaces, even after some heating, show excellent adhesion to paints and yield painted surfaces with good durability. A primer may therefore not always be required before application of a topcoat.

Line speed for a polyester-based laminate will typically range from about 4 to 8 ft./min. (about 1.2 to 2.4 m/min.), but can be faster with appropriate equipment modifications and with the appropriate catalyst and curing temperature.

The metal sheets used in the structural laminates of the present invention may be aluminum, steel, nickel, copper, titanium, magnesium, zinc, and the like, as well as various alloys thereof. Although it is generally preferred that the two metal sheets on a particular structural laminate according to the present invention be the same metal and in general the same thickness, structural laminates according to the present invention can be made with different metal sheets and with different thicknesses. When metal sheets of different thicknesses are used, it will in general desirable to have one metal sheet no more than about five times the thickness of the other metal sheet. While the use of various combinations of the above metals and various thicknesses will be apparent to one skilled in the art for particular applications, the discussion herein describing examples and embodiments of the present invention is primarily in terms of aluminum sheets and in terms of a preferred structural laminate wherein the metal aluminum sheets have essentially the same thickness. In addition, while the laminates of the present invention are referred to herein as "structural" laminates, the laminates of the present invention can also be used for decorative or protective purposes as well.

The structural laminates of the present invention in general have an overall thickness between about 0.1 inches and about 2 inches (about 0.25 cm to about 5 cm). Preferably, the overall thickness of the structural laminate of the present invention will be between about 0.1 and about 1.0 inches (about 0.38 cm and about 2.5 cm), and more preferably, between about 0.2 and about 0.75 inches (about 0.5 cm and about 1.9 cm) The metal sheets will in general have a thickness between about 0.015 inch (0.38 mm) and about 0.1 inch (2.5 mm), preferably between about 0.025 inch (0.63 mm) and about 0.075 inch (1.9 mm), and most preferably between about 0.035 inch (0.9 mm) and about 0.065 inch (1.7 mm). The thickness of the polymer or resin core can be any thickness within the above parameters, however, it is in general preferred that the thickness of the resin or polymer core be equal to or greater than the thickness of the two metal sheets combined.

The metal sheets can be any metal or alloy which preferably has the tensile strength of at least about 15,000 psi and a tensile (Young's) modulus of at least about $9 \times 10^6$ psi.

The surface properties as well as the surface condition and surface preparation of the metal sheets is frequently important in the structural laminates of the present invention because it is important that the polymer or resin core bond to the surfaces of the metal sheets with sufficient strength to provide the desired properties of the structural laminate. The surface properties of the metal sheets as well as the surface condition and the surface preparation will be apparent to one skilled in the art following the teachings of the present disclosure. The necessary or desirable properties of the metal surfaces will depend upon the type of polymer or resin core which is used, the type of curing mechanism and the like. The bonding of resins and polymer to metal surfaces is generally known to those skilled in the art, and selection and/or preparation of particular metal sheets having appropriate surface properties and conditions and selection of the particular resin or polymer formulation to obtain the laminate properties according to this invention will be apparent to on skilled in the art when following the criteria, guidelines and specifications disclosed in the description and examples set forth herein.

When aluminum sheets are used with a polyester resin, it is important that the surface be cleaned properly to ensure that it is free of rolling oils and other contaminates. This can be accomplished by one or more of the cleaning methods used in industry. These include vapor degreasing, treatment with non-etching or etching alkaline cleaning solutions, and/or treatment with acidic cleaning solutions. After cleaning, the surface is rendered receptive to the core resin, i.e., it is modified so as to provide strong adhesion to the cured resin core. The two preferred processes providing such a surface are anodizing with phosphoric acid and etching with chromic acid or dichromate-sulfuric acid. The former is preferred, since it is faster and does not present the toxicity and pollution hazards associated with chromium salts. A preferred surface preparation consists of cleaning the aluminum by solvent or vapor degreasing or by acid or alkaline treatment, or both, followed by anodizing with 10% phosphoric acid for about 5 minutes at a temperature of about 113° F. (45° C.) followed by a water rinse and air drying.

I have found that a poorly prepared or contaminated surface cannot be modified to give significantly stronger adhesion to the resin core by use of a primer. However, primers can be applied to active phosphoric acid - anodized surfaces without reducing adhesion to the resin core if desired.

The resins or polymers used to form the core between the metal sheets of the structural laminate of the present invention can be any desired type of resin having a desired curing mechanism which will provide the overall strength properties appropriate for use according to the present invention. The strength of the structural laminate of the present invention is provided in part by the strength properties of the resin used and in part by the bond strength between the resin and the surfaces of the metal sheets. The resin must be sufficiently tough (impact resistant) and rigid (high shear modulus) to provide adequate strength in the laminate. If the cured resin is too rigid, however, bonding to the metal surface is likely to be inadequate and the resin may be too brittle to provide good impact resistance. Therefore, the resin should have some flexibility to provide good bonding to the metal and good impact resistance. However, the resin should not be so flexible that it does not have sufficiently high shear modulus to provide the desired overall strength of the laminate. As is the case in resin formulating resins in many other uses, the desired properties are often competing and mutually exclusive and in order to achieve the desired overall characteristics of the laminate, a compromise or balance of particular properties is necessary. Following the examples and disclosure contained herein, one skilled in the art will be able to select, formulate and test the resin desired for a particular structural laminate to easily determine if a particular resin is useful for a particular application and will provide a laminate having characteristics according to this invention. In the event the desired characteristics for the laminate are not achieved initially with a particular resin, one skilled in the art, following the teaching of the disclosure herein, will be able to reformulate the resin to adjust the desired properties of the resin or change the surface preparation in order to provide the desired laminate having the characteristics of the laminates of this invention.

The various properties to be considered in selection of a polymer or resin for the core include the following. The liquid resin before it is cured should have a low viscosity to enable rapid and efficient mixing with catalyst or curing agent, the reinforcing material, density-reducing filler and to allow easy application by spraying in the fabrication of the laminate. The resin should have sufficient work time and be compatible with the fillers to be used. During the curing of the resin, any exotherm, gas evolution, volume change, and the like should be minimal and not interfere with the structure or properties of the final laminate.

The reinforcing material added to the polymer or resin to increase the strength of the polymer resin core will in general be various conventional materials used to form reinforced resin compositions. Any resin reinforcing material such as fibers, flakes, ribbons, filaments and the like, which function in the laminate of this invention to provide the necessary tensile strength and shear modulus of the core without interfering with the bond of the resin core to the metal sheets, may be used. Fiber reforcing materials can be present either as chopped fibers or in the form of woven fabrics or in nonwoven or mat configurations. However, since the preferred method of fabricating the structural laminates of the present invention involve mixing the liquid resin and fillers and then casting or spraying the resin mixture on one of the metal sheets or injecting the liquid resin containing the fibers between the two metal sheets, it is generally preferred to use the fibers in a chopped form. The same is true for flakes, ribbons, filaments and the like which can be chopped. A preferred method involves chopping the reinforcing material at the point where the resin is sprayed up to form the laminate. Reinforcing fibers useful in the present invention include fiberglass, carbon fibers, graphite fibers, aramid fibers, metal fibers and other organic and inorganic fibers. The formulation and use of particular reinforcing fibers with particular resin systems are known in the art; see *Handbook of Reinforcements for Plastics*, Milewski, et al., Van Nostrand Reinhold, New York (1987). The selection of appropriate fibers for the desired properties and for compatibility with the resin system being used will be apparent to one skilled in the art following the teachings of this disclosure.

The filler used in the resin core to lower the density of the core may be a foaming agent or blowing agent conventionally used to foam various resins, known by those skilled in the art. The desired specific gravity of the cured, reinforced, filled resin core in this invention should be in the range of about 0.8 to about 1.3, preferably about 0.85 to about 1.1 and more preferably about 0.85 to about 1.0. A preferred filler for providing this desired density of the resin core is glass microballoon filler or other expanded material which may have an average diameter up to about 1 millimeter, preferably between about 20 and about 300 microns, and more preferably in the range of about 30 microns to about 200 microns. Such microballoons fillers for resins are well known in the art as described in *Handbook of Fillers for Plastics*, Katz, et al., Van Nostrand Reinhold, New York (1987), pages 437–452. In some formulations the microballoons are preferred because they improve the impact resistance of the laminate of this invention and because they provide a more easily controlled manufacturing process and an easier to obtain uniformity than gaseous foaming agents. The microballoons used should preferably have a resin-compatible surface or coupling agents may be used to enhance the compatibility and the bonding of the resin to the surface of the microballoons. For example, when glass or ceramic microballoons are used in unsaturated polyesters or vinyl esters a silane coupling agent is desirable. This is similar to the use of coupling agents with fiberglass in reinforced resin systems. See Katz, et al., referred to above, pages 63–115. In some cases it may be desirable to include other additives such as wetting and suspending agents. Other fillers can also be used which increase the specific gravity of the core. But, for lower density cores and lighter weight laminates the microballoons and foaming agents are preferred.

The selection of polymers for use in the present invention can be facilitated by selecting a polymer which provides the desired properties when cured with the reinforcing fibers and the fillers present. The cured core is preferred to have a shear modulus, as defined herein, of at least about 40,000 psi for preferred structural laminates. Formulating a fiber reinforced, filled resin composition which will cure to have the desired shear modulus is within the skill of the art. Resin core compositions producing cores having a lower shear modulus may be used when the strength requirements of the laminate are lower or when the laminate is intended for non-structural uses. In such cases the shear modulus of the core may be as low as about 25,000 or 30,000 psi, but at least about 35,000 psi is usually preferred. The shear modulus of the cured reinforced filled resin core, without the metal sheets present is determined as described below.

An additional criteria and requirement for selecting polymers or polymer systems for use in this invention is the requirement that the neat polymer bond sufficiently to the metal surface with a bond strength sufficient to provide an ASTM D1002-72 lap shear (using neat resin) of at least 1000 psi. For non-structural uses the lap shear can be as low as about 500 psi but preferably is at least about 700 psi. This lap shear test. This lap shear test using neat resin reliably predicts whether the filled and reinforced resin core in the laminate structure, including the metal sheets, will fail by delamination when stressed in bending or subjected to impact. The test could be used to predict, however, whether a laminate will fail due to cracking of a core which is too brittle or due to a core which is too flexible.

In accordance with the test methods and calculations set forth in the following section, the properties of the structural laminates and panels of this invention, which provide the improved performance in various applications, such as in trailer body construction, are the one or more of following:

1. A tensile yield strength of at least about 2,000 lb. per in. in width and preferably at least about 2,500 lb./in.
2. A flexural modulus of at least about $2.5 \times 10^6$ psi for a 0.30 info thick laminate, preferably at least about $3 \times 10^6$ psi, and more preferably at least about $4 \times 10^6$ psi.
3. A shear modulus of the core of at least about 25 ksi, preferably at least about 33 ksi and more preferably at least about 40 ksi.
4. A rigidity index of at least about 2000, preferably at least about 3000, more preferably at least about 4000 and most preferably at least about 4500.
5. Pass the falling ball impact test described herein with no delamination of the core and the metal sheets and no cracks in the core.
6. Have moisture resistance whereby the laminate retains at least 70% of the dry flexural modulus and impact resistance after exposure of a 1 inch wide cut test specimen to liquid water for one month at 65° F. to 75° F., and preferably a retention of at least 80% of dry flexural modulus and impact resistance after exposure of the test specimen to liquid water at 65° F. to 75° F. for two months.

TEST METHODS AND CALCULATIONS

With the exception of impact resistance, all of the panel properties mentioned in the Examples herein were determined by standard methods, as follows:

Core Specific Gravity. This was calculated from the measured weight and dimensions of a panel sample and from the known weight of the metal facings for that sample.

Tensile Strength. Laminates were tested according to ASTM method D 838-84 (Type III), aluminum plate by ASTM B 209 and FRP plywood by ASTM D 3500-76.

Flexural properties. Test specimens $1 \times 6$ in. in size were evaluated in a 3-point bending test essentially in accordance with ASTM method D 790-84a, Method I using a 5.5-in. support span and a loading rate of 0.1 in./min. Typically, stress-strain plots for aluminum-faced laminates such as those listed in Table I were linear up to a load of 250 lb., with a corresponding deflection of 0.060 in. Flexural modulus was calculated using equation 5. The test was terminated when the specimen deflection at midspan reached 0.275 in. (5% of the support span as recommended), or earlier if the sample failed before reaching 0.275 in. deflection.

Flexural modulus. This property was calculated using equation (5) in ASTM method D 790-84a, where it is called "tangent modulus of elasticity".

$$E(B) = \frac{L^3 m}{4bd^3}$$

where $E(B)$ = flexural modulus, psi (1 ksi = 1000 psi)

$L$ = support span, in.

$m$ = deflection force, lb./in., i.e. force required for 1 in. deflection in 3-point bending stiffness test. lb./in. ($= P/\Delta$, with $P$ and $\Delta$ as defined below);

$b$ = test specimen width, in.

$d$ = specimen thickness, in.

The flexural modulus is widely used as a measure of rigidity of plastics and of composites. It is useful for comparisons of gross material properties, but it provides no information on the relative contributions of the facings and of the core in sandwich laminates. Deductions from comparisons of the E(B) values of different laminates are difficult to draw if there is considerable variation in total laminate thickness d, as has been the case in the present work.

Shear Modulus. To permit a more meaningful comparison of laminate properties, and in particular to assess the separate contributions of the facings and the core, the shear modulus of the core was calculated from the 3-point bending test results using the following relationship:

$$G(c) = \frac{K(s)PL}{hb\left(\Delta - \frac{K(b) PL^3}{D}\right)}$$

where $G(c)$ = shear modulus of core, psi (1 ksi = 1000 psi) of the core $K(s)$ = shear deflection constant = 0.25

$P$ = load on specimen, lb.

$\Delta$ = deflection due to load at midspan in elastic regime, in.

$K(b)$ = bending deflection constant = 0.02083

$D$ = specimen stiffness, lb.-in. = $E(f)t(f)h^2b/2(1 - \mu^2)$ $E(f)$ = tensile modulus of facing material, psi(10.1 million psi for the aluminum alloys used here)

$t(f)$ = facing thickness, in.

$t(c)$ = core thickness, in.

$h$ = centroid distance = $t(c) + t(f)$ (if both facings are of the same thickness)

$b$ = width of the test specimen, in.

$\mu$ = Poisson's ratio (= 0.33 for aluminum)

$(1 - \mu^2)$ = 0.89 for aluminum.

The above relationship is based on derivations of relevant formulas for stress analysis published in several references. One of the more recent appeared in *Engineered Materials Handbook*, Vol.1, Composites, p.328, ASM International, Metals Park, Ohio, 1987.

Rigidity Index. This composite measure of panel utility was calculated using the relationship $$RI = \frac{m}{bdW}$$

where

-continued

R.I. = rigidity index b = panel test specimen width, in.

d = panel thickness, in.

W = panel basis weight, lb/sq.ft.

The rigidity index is a dimensionless value representing the rigidity of the panel—expressed as the calculated force needed for a deflection of 1 in. at midspan in the 3-point bending test in the elastic regime—per unit panel thickness and per unit panel basis weight. The force m is identical with the factor m in equation 5 in ASTM test D 790. This force was calculated from measured deflections that were considerably less than 1 in. Typically, they were less than 0.07 in. At higher deflections the stress-strain relationship began to depart from linearity. It should also be noted that R.I. values are only comparable if based on the same support span length (L above) in the 3-point bending test. In this disclosure, all R.I. values are based on measurements with a support span of L=5.5 in.

Impact Resistance. The only non-standard procedure used in the present work was the falling ball impact test. It was conducted as follows. The test specimen was a 1×6 in. section of the laminate or panel being investigated (laminate, FRP plywood, or 0.25 in. aluminum plate), identical in size with that used in the 3-point bending test. As shown in FIG. 2, the specimen 21 was placed with its long dimension A across the gap B between two 1 in. wide and 4 in. long pieces 22 of 0.25 in. thick aluminum plate fastened 2.0 in. apart to a flat base plate 23, also made of 0.25 aluminum. The base plate was 4×9 in. in size, and rested on a smooth, level concrete floor. A 2.75-in. steel sphere 24, weighing 3.0 lb. and held by an eyelet 26, was dropped through a 3 in. inner diameter plastic guide pipe 25 onto the center of the test specimen from a height C of 18 in. The specimen tested was inspected for signs of delamination between the facings and the core (or in the case of plywood, between plies) and of cracking of the core. Ratings were assigned to both properties ranging from 0 for severe failure to 5 for no visible effect. In addition, the maximum permanent deflection of the test strip was recorded. For the 0.25 aluminum plate, only the deflection was measured, of course.

Lap Shear Strength. This property was determined in accordance with ASTM method D1002-72 using catalyzed neat resins (without filler or reinforcement) on 1×6 in. strips of metal sheet, with an overlap of 0.5 in. Assembled specimens were cured under low pressure (3-5 psi) for 2 hours at 212° F. Tests were carried out with an Instron tester at a crosshead speed of 0.05 in./min.

Having disclosed this invention in the above disclosure, I include the following examples and embodiments of the invention to illustrate how this invention is practiced by one skilled in the art following the teachings herein.

EXAMPLE I

Small-Scale Preparation of Laminate

Frame. Single 12×18 in. (305×457 mm) panels were assembled in a specially designed frame with reusable edge inserts. The frame consisted of a 12×20 in. (305×508 mm) base plate made of 0.25 in. (6.3 mm) thick aluminum with a 1-in. (25 mm) wide, 0.5 in. (13 mm) thick polypropylene bar bolted to one of the 12-in. edges. The principal purpose of the reusable edge inserts, which were equal in thickness to the desired core thickness, was to ensure separation of the face sheets at the proper distance, and to prevent liquid resin from exuding prior to gelation. Another function of the long inserts was to provide panels with a recessed core at the edges, allowing insertion of a solid metal splice for subsequent joining of two panels.

A cross section of the frame for fabricating 12×18 in. laminates is shown in FIG. 3a. The 18-in. inserts consisted of steel strips 33 covered with 0.03 or 0.06 in. (0.76 or 1.52 mm) thick polypropylene sheet 34, with an overall thickness equal to the desired core thickness. The inserts were attached to other metal strips 35 so that the whole insert assembly would firmly fit over the edge of the bottom facing 31 and the base plate 32. The 18-in. inserts were 1.5 in. (38 mm) wide. Inserts for the 12-in. edges (about 9 in. long) were of the same thickness but were inserted loosely. They were constrained within the sandwich panel by the bolted-on polypropylene bar on one side, and by small C-clamps on the other. After assembly as described below, the top facing 37 was finally secured with a 0.25-in. (6.3 mm) thick aluminum cover plate 38 to the spacers and the base plate with clamps at the pressure points 39, and the panel core 36 was allowed to cure.

For some of the tests, panels were prepared in smaller sizes, generally 6×12 in. (152×305 mm). The procedure was similar, with the exception that removable inserts were placed loosely only along the shorter (6 in.) edges, while solid 1×0.5 in. polypropylene bars bolted to the base plate on the outside of the longer (12 in. edges) acted as barriers to keep the viscous, uncured core mixture confined within the sandwich panel. In cases where less viscous resins tended to exude from the core before curing (especially under pressure after the top sheet was clamped down), 1-in. wide masking tape was used to seal the long edges. The removable inserts were made of aluminum loosely covered with polypropylene sheet, or of solid polypropylene.

Facings. These were typically 0.047 to 0.051 in. (1.19 to 1.29 mm) thick, 12×18 in. (305×457 mm) or 6×12 in. sheets of 5052-H32 or 5052-H34 aluminum alloy. After evaluation of various possible surface treatments, a standard procedure was adopted for preparing the surface for tests of the variables. The aluminum was cleaned by vapor degreasing with trichloroethylene at atmospheric pressure for 5 min., followed by immersion in a commercial mild alkaline cleaner (a dilute sodium carbonate solution with an added surfactant) for 30 sec. at 50° C., and then anodized in 10%w phosphoric acid at 10 volts and a current density of 10 amperes/sq. ft. (108 A/sq. meter) for 5 min. at 113° F. (45° C.). Rectified 3-phase current with less than 5% ripple was used. A lead sheet served as the cathode. Anodized sheets were rinsed and dried with air heated to 120° F. (50° C.).

Resin Mixture B. To a blend of 275 g 1063-5 orthophthalic polyester resin (Koppers Co.) and of 275 g Derakane 8084 vinyl ester resin (Dow Chemical Co.) was added with mixing, in the sequence listed, 0.137 g (0.025 parts per hundred parts of resin (phr)) N,N-dimethylaniline (DMA); 1.10 g cobalt naphthenate (0.20 phr) with a cobalt content of 6%; 8.80 g (1.60 phr) methyl ethyl ketone peroxide (MEKP) solution with a nominal active oxygen content of 9%; 27.5 g (5 phr) Dicaperl HP 210 glass microballoons (Grefco) and 55 g (10 phr) CR 352 fiberglass roving (Owens Corning Fiberglas), cut to 0.50-in. length. The resulting mixture had the consistency of a putty, with a gel time of about 25 min. at 68° F. (20° C.)

Resin Mixture D. To 550 g Derakane 8084 vinyl ester resin was similarly added with mixing 0.275 g (0.05 phr) DMA; 2.25 g (0.4 phr) cobalt napthenate, 9.60 g (1.75 phr) MEKP solution; 22 g (4 phr) Dicaperl HP 210 microballoons and 55 g (10 phr) CR 352 fiberglass roving, 0.5 in. long. This mixture had a similar consistency, with a gel time of about 40 min. at 68° F.

Fabrication. An anodized sheet serving as the bottom facing was placed on the assembly frame and fastened to the base plate with the two 18 in. (45.72 cm) long inserts. The short inserts were placed along the narrower edges of the sheet. They had been cut to a length about 0.16 in. (4 mm) shorter than the distance between the long inserts, providing for a gap through which air and a small amount of liquid resin could escape during assembly of the panel. The freshly catalyzed resin mixture, prepared as described above, was then evenly spread on the bottom facing between the inserts, making certain that the top surfaces of the inserts remained clean and dry. The second facing sheet and the cover plate were then placed on top and secured to the frame with clamps.

Cure. The whole assembly was allowed to stand at ambient temperature for about 1 hour and then placed in an oven for 2 hours at 100.C. After cooling, the panel was separated from the frame and, after removal of the inserts, was used for testing. Panels prepared with the removable inserts had a recessed core along at least two edges as shown in FIG. 3b. This edge design allowed panels to be fastened together with internal metal joining strips as described in a later Example.

Laminate Properties. Test specimens were cut from the cured panels with a saw. All rough edges were filed smooth. The cores contained very few visible air bubbles trapped during mixing and assembly. The glass fibers appeared moderately well dispersed. All water exposures were carried out with specimens cut to the proper dimensions for the various tests.

The results of the tests of two representative laminates are summarized in Table I. Also listed for comparison are test results for two other structural panel materials used commercially in truck trailers, namely nominal ¼-in. aluminum plate as well as FRP (fiberglass-reinforced plastic-faced) plywood of two thicknesses—⅜ and ⅝ in.—widely used in trailer manufacture. These thicknesses refer to the nominal thickness of the plywood core. The performance properties shown in Table I include tensile strength, elongation at break during the tensile test, rigidity, flexural modulus, and impact resistance. The rigidity index is a calculated composite property. The test procedures and methods of calculation are described more fully in an earlier section. The rigidity index is a measure of the utility of a structural laminate in applications such as truck trailers where the most desirable properties include high rigidity, low thickness and low weight.

The results show that the structural laminates of this invention were equal or superior in rigidity (in its most direct measure, the deflection force m) to both of the above types of commercial panel materials, but were lower in basis weight (weight per unit area) than the aluminum plate and the ⅝in. FRP plywood, and in the same range as ⅜ in. FRP. The flexural modulus of the laminates of this invention exceeded that of other composite laminates of similar thickness reported in the literature. It was considerably higher than that of FRP plywood, and more than 50% of that of the solid aluminum plate. The tensile yield strength of the laminates of this invention was in a similar range as that of FRP plywood (that of solid aluminum plate is unnecessarily high).

After exposure to water, my laminates were clearly superior to FRP plywood, which had lost nearly half of its rigidity and one-quarter to one-third of its tensile strength. Examination of samples of the laminates of this invention after forced mechanical separation of the facings showed on evidence that the bond-metal interface had been weakened by water. As indicated above, the laminate and plywood specimens exposed to water prior to rigidity and impact testing were 1×6 in. in size. Since the cores were exposed at the edges, the maximum distance over which water had to diffuse was only 0.5 in. for wetting of the resin or of the resin-metal bond. Other than a slight reduction in rigidity due to the effect of moisture, there was no loss in the laminates of this invention in important properties of the magnitude encountered with FRP plywood.

The laminates of this invention matched ¼-in. aluminum plate in a falling ball impact test, displaying similar permanent deflection without core failure or delamination. Both types of FRP plywood, on the other hand, failed the impact test when dry. Considering that m laminate is significantly thinner than FRP plywood, closely approaching the low thickness of the heavier ¼-in. aluminum plate, its advantages in applications such as truck trailer panels are evident. This is also reflected in the rigidity index values of the laminates of this invention, which are significantly higher than those of the other two types of panel materials.

TABLE I

Properties of Panels

| Sample | Panel composition (a,b) | Panel thickness in. | Panel basis weight lb./sq. ft. | Tensile strength lb./in. width | | Elongation at break % |
|---|---|---|---|---|---|---|
| | | | | Yield | Ultimate | |
| | New laminates with reinforced, filled resin core | | | | | |
| | 0.051 in. aluminum facings, 5052-H34 alloy, resin mixture B | | | | | |
| I-1 | At 50% rel. humidity | 0.322 | 2.56 | 3350 | 4330 | 5 |
| I-2 | At 50% rel. humidty | 0.320 | 2.58 | | | |
| I-2 | After 2 months in water | 0.322 | 2.59 | | | |
| | 0.050 in. aluminum facings, 5052-H32 alloy, resin mixture D | | | | | |
| I-3 | At 50% rel. humidity | 0.319 | 2.45 | 2845 | 3590 | |
| I-3 | After 3 months in water | 0.321 | 2.45 | 2820 | 3525 | |
| I-4 | Aluminum plate; properties in rolling direction 5052-H32 alloy; properties | 0.26 | 3.70 | 6315 | 9516 | 13 |

TABLE I-continued

Properties of Panels

FRP plywood; nominal ⅜ in. core, with 0.044 in. (ave.) inside and
outside FRP facings properties parallel to face grain

| | | | | | | |
|---|---|---|---|---|---|---|
| I-5 | At 50% rel. humidity | 0.786 | 2.92 | 4320 | 4790 | 4 |
| I-5 | After 12 days in water | 0.827 | 4.55 | 2900 | 3550 | 5 |

FRP plywood; nominal ⅜ in. core, with 0.038 in. inside and 0.047 in.
(ave.) outside FRP facings properties parallel to face grain

| | | | | | | |
|---|---|---|---|---|---|---|
| I-6 | At 50% rel. humidity | 0.645 | 24.4 | 2700 | 3960 | 2 |
| I-6 | After 12 days in water | 0.679 | 3.73 | 2150 | 2800 | |

| Sample | 3-Point bending test Deflection force m lb./in. | Maximum deflection in. | Core shear modulus ksi | Flexural modulus ksi | Rigidity index | Impact resistance Rating | Deflection in. |
|---|---|---|---|---|---|---|---|
| I-1 | — | — | — | — | — | — | — |
| I-2 | 4350 | >0.275 | 79 | 5469 | 5215 | 5 | 0.06 |
| I-2 | 3845 | >0.275 | 70 | 4790 | 4610 | 5 | 0.08 |
| I-3 | 4000 | >0.275 | 64 | 5126 | 5120 | 5 | 0.06 |
| I-3 | 3570 | >0.275 | 55 | 4489 | 4540 | 5 | 0.09 |
| I-4 | 3690 | >0.275 | — | 8728 | 3875 | 5 | 0.06 |
| I-5 | 4354 | 0.110 | 18 (b) | 353 | 1895 | 3 | 0 |
| I-5 | 2390 | 0.270 | | 261 | 635 | 5 | 0 |
| I-6 | 2900 | 0.180 | 18 (b) | 450 | 1840 | 4 | 0 |
| I-6 | 1835 | >0.275 | | 244 | 725 | 5 | 0 |

(a) Details in Example I.
(b) Calculated from tests of aluminum-faced laminates with 0.25-in. plywood core

EXAMPLE II

Effect of Facing Material

Although the preferred facing material is aluminum, other metals can also be used to advantage. In this example, the laminates of this invention are illustrated by panels which were prepared from 0.018 in. cold-rolled steel sheet (A.I.S.I. alloy 1015) that had been glass bead-blasted and then vapor-degreased with trichloroethylene. The core material was based on a polyamide-cured epoxy resin as indicated in Table II. Panels 6×12 in. (152×305 mm) in size were prepared by a method similar to that described in Example I, and cured at 212° F. (100° C.) for 2 hours. An aluminum-faced (5052-H32 alloy) panel was similarly prepared using the same resin system for the core.

The test properties of both laminates are summarized in Table II. Since both laminates exhibited slight cracking of the core but no delamination in the impact test, another aluminum-faced panel was prepared in which a slightly more flexible epoxy resin mixture was used for the core. Its composition and the properties of the resulting laminate are also listed in Table II. This second aluminum panel passed the impact test with no sign of delamination or core cracking. This improvement was primarily due to the improved toughness of the resin which, however, also resulted in a lower shear modulus. Other tests have shown that the contribution of the slightly higher core thickness to the impact resistance of this panel was minor.

TABLE II

Properties of Laminates

| Sample | Laminate composition Facings | Core (a) | Panel thickness in. | Basis weight lb./sq. ft. | Core specific gravity | 3-Point bending test Deflection force m lb./in. | Maximum deflection in. | Core shear modulus ksi | Flexural modulus ksi | Impact resistance Rating | Deflection in. |
|---|---|---|---|---|---|---|---|---|---|---|---|
| II-1 | 0.018 in. steel, bead-blasted | Epoxy formulation E | 0.260 | 2.57 | 0.825 | 3360 | >0.275 | 61 | 7181 | 4 | 0.10 |
| II-2 | 0.050 in. aluminum, phosphoric acid-anodized | Epoxy formulation E | 0.327 | 2.42 | 0.831 | 4000 | >0.275 | 56 | 4759 | 4 | 0.07 |
| II-3 | 0.050 in. aluminum, phosphoric acid-anodized | Epoxy formulation E | 0.346 | 2.51 | 0.833 | 4050 | >0.275 | 44 | 4069 | 5 | 0.09 |

(a) Resin mixtures consisted of epoxy resin, 50 phr Ancamide 400 curing agent (Pacific Anchor), 4 phr HP 210 glass microballoons (Grefco), and 10 phr chopped 0.5 in. CR 352 fiberglass (Owens-Corning Fiberglas). Resin E was Epotuf 37-138 (100%, Reichhold). Resin F was blend of Epotuf 37-139 (75% w) and DER 732 (25%, Dow).

EXAMPLE III

Effect of Aluminum Surface Treatment

Panels were prepared from aluminum sheets that had been subjected to the most common treatments used in preparing the surface for coating, laminating or adhesive bonding. These included glass bead blasting, etching with caustic, treatment with a commercial aqueous alkaline formulation (Alodine 401), anodizing with sulfuric acid, treatment with sulfuric acid-dichromate solution (known as the Forest Products Laboratory or FPL etch), and anodizing with phosphoric acid.

Three unsaturated polyester resin - vinyl ester resin blends were used for the cores as indicated in Table III. One blend, designated as A1 in Table III, gave better results with phosphoric acid-anodized aluminum than with three other commercial surface treatments. Cores made with this blend were somewhat brittle, however, and impact resistance was limited. A somewhat different blend of the same two resins, designated A2, gave acceptable impact resistance but also resulted in a lower shear modulus and lower panel rigidity.

Fully acceptable performance was obtained with resin Blend B, but here again only when the aluminum had been anodized with phosphoric acid or treated with the FPL etch. Not only did the laminates pass the impact test but they also displayed very good rigidity, due to a high shear modulus of the core, but without excessive brittleness.

The results in Table III also illustrate the fact that to prevent delamination during the bending or impact tests, there must be a strong bond between the core and the facing. Bond strength can be estimated from lap shear strength tests with neat, catalyzed resin. These and other results of my work indicate a lap shear strength of at least 1000 psi is required. Even with an effectively bonding resin system such as blend B, only phosphoric acid anodizing or the FPL etch was capable of providing a sufficiently active aluminum surface to meet this requirement.

chopped fiberglass reinforcement and were catalyzed with methyl ethyl ketone peroxide. The laminates were cured 2 hr. at 212° F. (100° C.). Additional data on laminate compositions are listed in Table IVa. The microballoons and chemical blowing agents are described in Table IVb. To show the relationships between microballoon concentration and laminate properties more clearly, relevant data have been plotted in FIGS. 4 and 5.

The results led to the following conclusions:

1. All of the microballoon grades and blowing agents tested were effective in reducing the specific gravity of the core significantly. In a number of cases, core density reductions of 30% were readily achieved without loss in important laminate properties. The corresponding reduction of specific laminate weight, ranging around 15%, represents important savings in materials weight and cost, and in vehicles such as trailers can additionally improve fuel economy.

Figure 4:
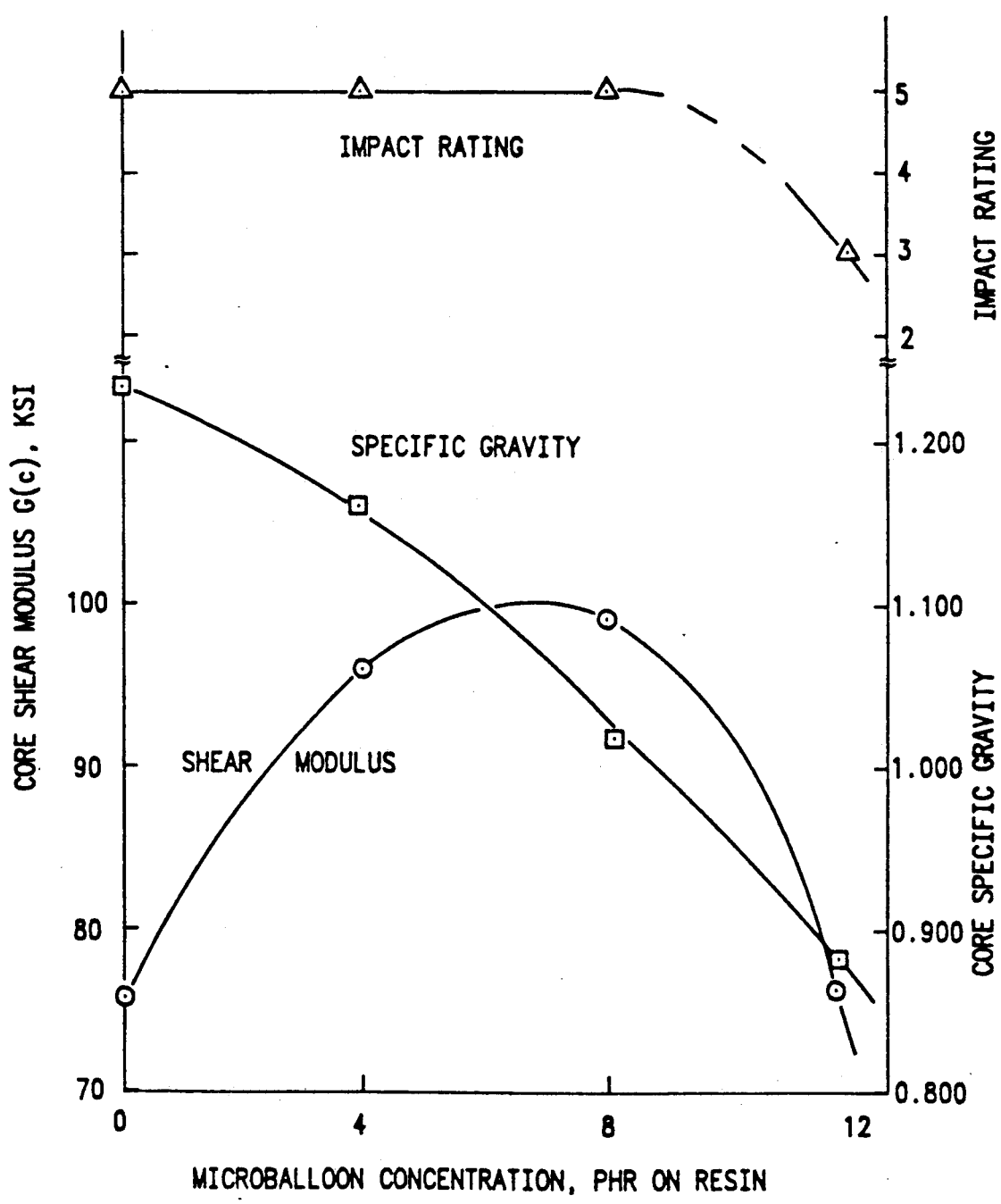
FIG. 4 shows in graphic form some of the data of Example IV, Table IVa.
Figure 5:
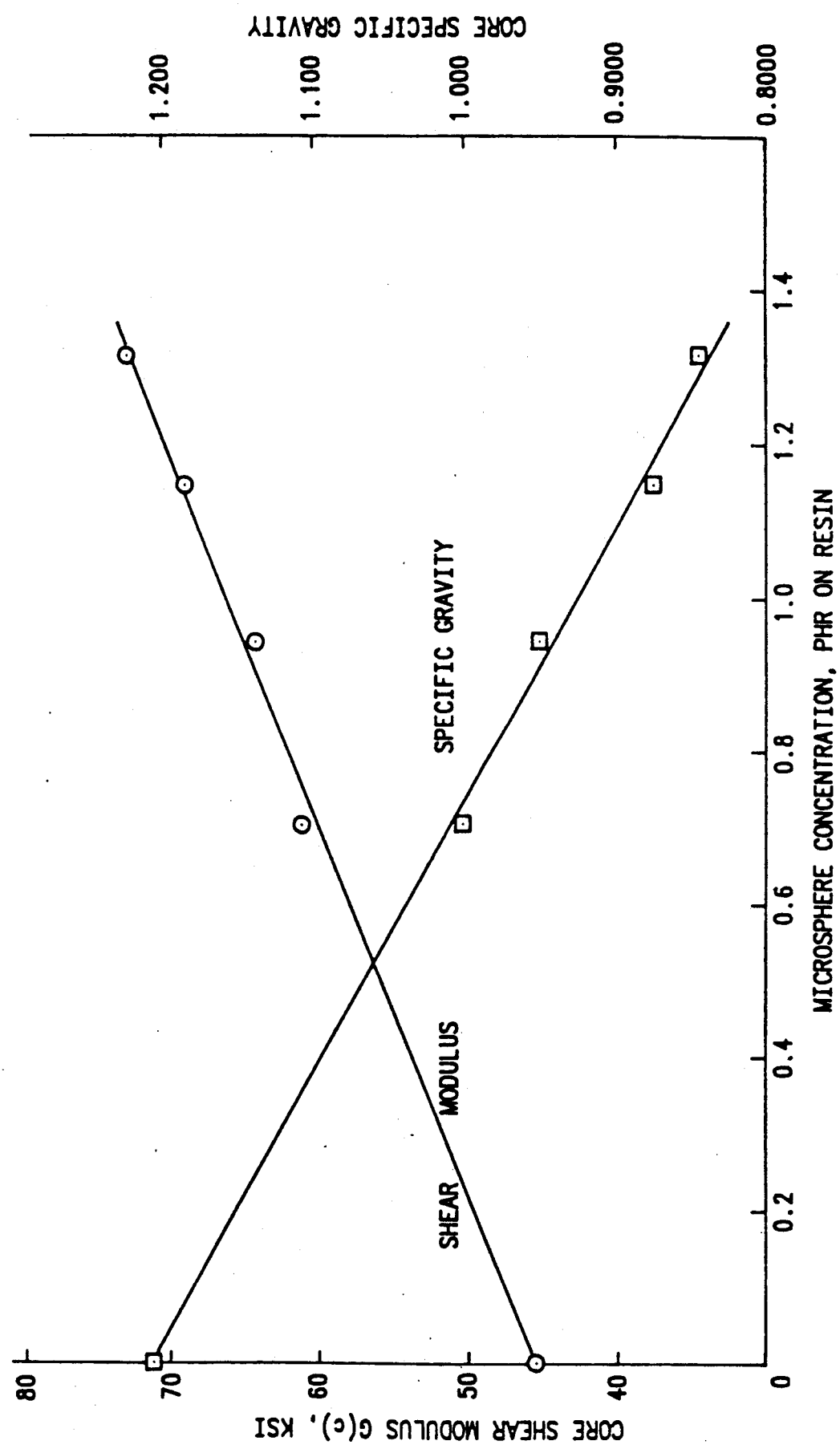
FIG. 5 shows in graphic form some of the data of Example IV, Table IVa.

2. Microballoons can contribute to rigidity. FIGS. 4

TABLE III

Effect of Aluminum Surface Treatment

| Sample no. | Thickness in. | Alloy | Surface treatment (a) | Core (b) | Panel thickness in. | Basis weight lb./sq. ft |
|---|---|---|---|---|---|---|
| III-1 | 0.050 | 5052-H32 | Anodized w/H2SO4 | Resin blend A1 | 0.329 | 2.44 |
| III-2 | " | " | Anodized w/H2SO4, sealed | " | 0.344 | 2.48 |
| III-3 | " | " | Treated w/Alodine 401 | " | 0.350 | 2.49 |
| III-4 | " | " | Anodized w/H3PO4 | " | 0.312 | 2.43 |
| III-5 | " | " | Anodized w/H3PO4 | Resin blend A2 | 0.292 | 2.56 |
| III-6 | 0.047 | 5052-H34 | Degreased & cleaned | Resin blend B | 0.311 | 2.41 |
| III-7 | " | " | Bead-blasted | " | 0.325 | 2.52 |
| III-8 | " | " | Etched with caustic | " | 0.305 | 2.31 |
| III-9 | " | " | Anodized w/H2SO4 | " | 0.313 | 2.36 |
| III-10 | " | " | Treated w/Alodine 401 | " | 0.315 | 2.48 |
| III-11 | " | " | Anodized w/H3PO4 | " | 0.315 | 2.51 |
| III-12 | 0.050 | 5052-H32 | Etched w/H2SO4 + Na2CrO7 (FPL) | " | 0.329 | 2.49 |

| Sample no. | 3-pt. bending test | | | Impact resistance | | Neat resin lap shear strength psi |
|---|---|---|---|---|---|---|
| | Deflection force m lb./in. | Maximum deflection in. | Core shear modulus ksi | Rating | Deflection in. | |
| III-1 | 5370 | >0.275 | 67 | 3 | 0.09 | 605 |
| III-2 | 5620 | >0.275 | 70 | 3 | 0.05 | 570 |
| III-3 | 5110 | 0.121 | 52 | 1 | 0.11 | 400 |
| III-4 | 5160 | >0.275 | 77 | 4 | 0.08 | 1620 |
| III-5 | 2880 | 0.187 | 41 | 5 | 0.09 | 1620 |
| III-6 | (c) | 0.045 | (c) | 0 | (c) | <400 |
| III-7 | (c) | 0.012 | (c) | 1 | 0.25 | 540 |
| III-8 | (c) | (c) | (c) | 0 | (c) | 930 |
| III-9 | (c) | 0.020 | (c) | 1 | 0.20 | 700 |
| III-10 | (c) | 0.010 | (c) | 1 | 0.33 | 410 |
| III-11 | 5050 | >0.275 | 76 | 5 | 0.07 | 2020 |
| III-12 | 5140 | >0.275 | 59 | 5 | 0.05 | 1990 |

(a) Details in Example III.
(b) Core compositions:
A1 - Blend of 6246 isopthalic polyester resin (67% w, Koppers) and Derakane 8084 vinyl ester (33%, Dow) with 0.015 phr DMA, 0.15 phr cobalt naphthenate, 1.6 phr MEK peroxide, 8 phr HP 210 microballoons and 10 phr CR 352 0.5 in. chopped fiberglass.
A2 - Similar to A1 but with 4 phr instead of 8 phr HP 210 microballoons.
B - Blend of 1063-5 orthophthalic polyester (50% w, Koppers) and Derakane 8084 (50%), with 5 phr HP 210 microballoons and 10 phr CR 352 chopped 0.5 in. fiberglass. Initiator system as described in Example I.
(c) Delamination prevented accurate measurement.

EXAMPLE IV

Effect of Microballoons and Foaming Agents.

Laminates were prepared from 6×12 in. (152×305 mm) sheets of phosphoric acid-anodized aluminum by a similar procedure as described in Example I. Several different grades of microballoons were added to determine their effects on specific gravity of the core and on key laminate properties. Two chemical blowing agents were similarly evaluated. All resin mixtures contained and 5 show that over certain concentration ranges, glass microballoons as well as polymeric microspheres can increase core shear modulus up to a point. With higher add-ons, the volume ratio occupied by glass-reinforced resin declines to a point where both rigidity as well as impact resistance suffer. Core compositions can thus be designed to have the best desired balance of weight and performance properties.

3 Chemical blowing agents appear to be less effective in retaining impact resistance as core density is reduced.

The production process is also more difficult to control, since concentrations of the blowing agent and of the MEK peroxide as well as curing schedules must be closely controlled so as to properly synchronize gas production and foaming with polymerization and gelling of the resin. Furthermore, it is also generally more difficult to achieve uniform distribution of the reinforcing fibers in the foamed core.

In other tests, some of the compositions listed in Table IVa were applied with a commercial airless spray gun ("chopper" gun) at nozzle pressures in the 400–700 psi range. At these pressures, some of the microballon grades listed in the Table appeared to be crushed, with the result that cured resin mixtures displayed higher than expected densities. Other grades, such as Q-CEL 2106 and the Expancel products, were relatively unaffected. Measured densities of the cured cores were in close agreement with values calculated from the known densities of cured, glass-reinforced resins and from the true densities of the dry microballoons. Low-pressure spray gun designs are available than can dispense resin mixtures containing some of the more fragile microballoon grades without crushing or breaking them.

TABLE IVa

Effect of Microballoons and Foaming Agents

| | Panel composition | | | | | | | |
|---|---|---|---|---|---|---|---|---|
| | Facing | | Core (a) | | | Panel | Basis | Core |
| | Thickness | | | Low-density additive | | thickness | weight | specific |
| Sample | in. | Alloy | Resin | Grade | phr | in. | lb./sq. ft. | gravity |
| IV-1 | 0.050 | 5053-H32 | Blend B | None | 0 | 0.290 | 2.65 | 1.223 |
| IV-2 | " | " | " | HP 210 | 5.0 | 0.292 | 2.60 | 1.157 |
| IV-3 | " | " | " | " | 8.0 | 0.314 | 2.57 | 1.010 |
| IV-4 | " | " | " | " | 12.0 | 0.325 | 2.46 | 0.872 |
| IV-5 | " | " | " | HP 510 | 8.0 | 0.322 | 2.46 | 0.886 |
| IV-6 | 0.047 | 5052-H34 | " | HP 210 | 5.0 | 0.319 | 2.66 | 1.115 |
| IV-7 | " | " | " | HP 220 | 5.0 | 0.330 | 2.48 | 0.905 |
| IV-8 | " | " | " | HP 520 | 8.0 | 0.327 | 2.51 | 0.950 |
| IV-9 | 0.050 | 5052-H32 | " | Q-CEL 200 | 8.0 | 0.318 | 2.41 | 0.851 |
| IV-10 | " | " | " | Q-CEL 600 | 8.0 | 0.321 | 2.49 | 0.913 |
| IV-11 | 0.051 | 5052-H34 | " | Q-CEL 2106 | 9.0 | 0.342 | 2.60 | 0.903 |
| IV-12 | 0.047 | " | " | EX 461 DE | 2.0 | 0.334 | 2.42 | 0.813 |
| IV-13 | 0.051 | " | " | EX 551 DE | 0.7 | 0.309 | 2.55 | 1.007 |
| IV-14 | " | " | " | " | 0.9 | 0.319 | 2.57 | 0.970 |
| IV-15 | " | " | " | " | 1.1 | 0.306 | 2.42 | 0.892 |
| IV-16 | " | " | " | " | 1.3 | 0.312 | 2.41 | 0.857 |
| IV-17 | " | " | " | Cel. XP100 | 1.7 | 0.351 | 2.57 | 0.905 |
| IV-18 | " | " | B608-64 (b) | Luperfoam | 1.0 | 0.295 | 2.37 | 0.896 |

| | 3-Point bending test | | | | Impact resistance | |
|---|---|---|---|---|---|---|
| | Deflection | Maximum | Core shear | | | Deflection |
| | force m | deflection | modulus | Rigidity | | |
| Sample | lb./in. | in. | ksi | index | Rating | in. |
| IV-1 | 3450 | >0.275 | 76 | 4490 | 5 | 0.11 |
| IV-2 | 3705 | >0.275 | 95 | 4880 | 5 | 0.09 |
| IV-3 | 4350 | >0.275 | 98 | 5400 | 5 | 0.08 |
| IV-4 | 4340 | >0.275 | 75 | 5430 | 3 | 0.04 |
| IV-5 | 3850 | >0.275 | 54 | 4850 | 5 | 0.09 |
| IV-6 | 4350 | >0.275 | 97 | 5150 | 5 | 0.07 |
| IV-7 | 4150 | >0.275 | 60 | 5030 | 4 | 0.05 |
| IV-8 | 4310 | 0.252 | 76 | 5250 | 4 | 0.04 |
| IV-9 | 4000 | >0.275 | 66 | 5230 | 5 | 0.07 |
| IV-10 | 3580 | >0.275 | 45 | 4470 | 5 | 0.07 |
| IV-11 | 4675 | >0.275 | 67 | 5270 | 5 | 0.04 |
| IV-12 | 4260 | >0.275 | 53 | 5110 | 5 | 0.06 |
| IV-13 | 3710 | >0.275 | 61 | 4700 | 5 | 0.10 |
| IV-14 | 4000 | >0.275 | 63 | 4890 | 5 | 0.09 |
| IV-15 | 3760 | >0.275 | 68 | 5090 | 5 | 0.08 |
| IV-16 | 4000 | >0.275 | 73 | 5330 | 5 | 0.06 |
| IV-17 | 5245 | >0.275 | 92 | 5830 | 4 | 0.06 |
| IV-18 | 3333 | >0.275 | 58 | 4770 | 3 | 0.07 |

(a) Blend B consisted of 1063-5 polyester (50% w) and Derakane 8084 vinyl ester (50%). The initiator system was as described in Example I. Resin mixtures contained 10 phr CR 352 fiberglass (0.5 in.), except nos. IV-13 through -17, where 10 phr chopped 0.75 in. CL 392 fiberglass (Certainteed Corp.) was used. Low-density additives are listed in Table IVb.
(b) Supplied by Koppers Co. for use with Luperfoam 329 system (Pennwalt Corp.). No DMA or cobalt was added; MEK peroxide add-on was 2.0 phr.

TABLE IVb

Microballoons and Foaming Agents

| Grade | Supplier | Composition | Bulk density g/cm 3 | Particle size, um | Comments |
|---|---|---|---|---|---|
| Dicaperl HP 210 | Grefco, Inc. | Glass microballoons | 0.08 | 110 Ave. | Surface-modified |
| Dicaperl HP 510 | " | " | 0.11 | 70 Ave. | " |
| Dicaperl HP 220 | " | " | 0.08 | 110 Ave. | Surface modifier different |
| Dicaperl HP 520 | " | " | 0.11 | 70 Ave. | from that on HP 210 and 510 |
| Q-CEL 200 | PQ Corp. | " | 0.40 | 20-200 | Surface-modified |
| Q-CEL 600 | " | " | 0.20 | 62 Ave. | " |
| Q-CEL 2106 | " | " | 0.20 | 60 Ave. | " |
| Expancel 461 DE | Nobel | Expanded copolymer | 0.05 | 40-60 | |

TABLE IVb-continued

| | | Microballoons and Foaming Agents | | | |
|---|---|---|---|---|---|
| Grade | Supplier | Composition | Bulk density g/cm 3 | Particle size, um | Comments |
| Expancel 551 DE | Industries AB Nobel Industries AB | microspheres Expanded copolymer microspheres | 0.036 | 40–60 | |
| Celogen XP100 | Uniroyal, Inc. | Sulfonylhadrazide blowing agent | — | — | Reacts with peroxide to form nitrogen gas |
| Luperfoam 329 | Pennwalt Corp. | Alkyl hydrazinium chloride and ferric chloride | — | | " |

EXAMPLE V

Effect of Fiber Reinforcement

Figure 6:
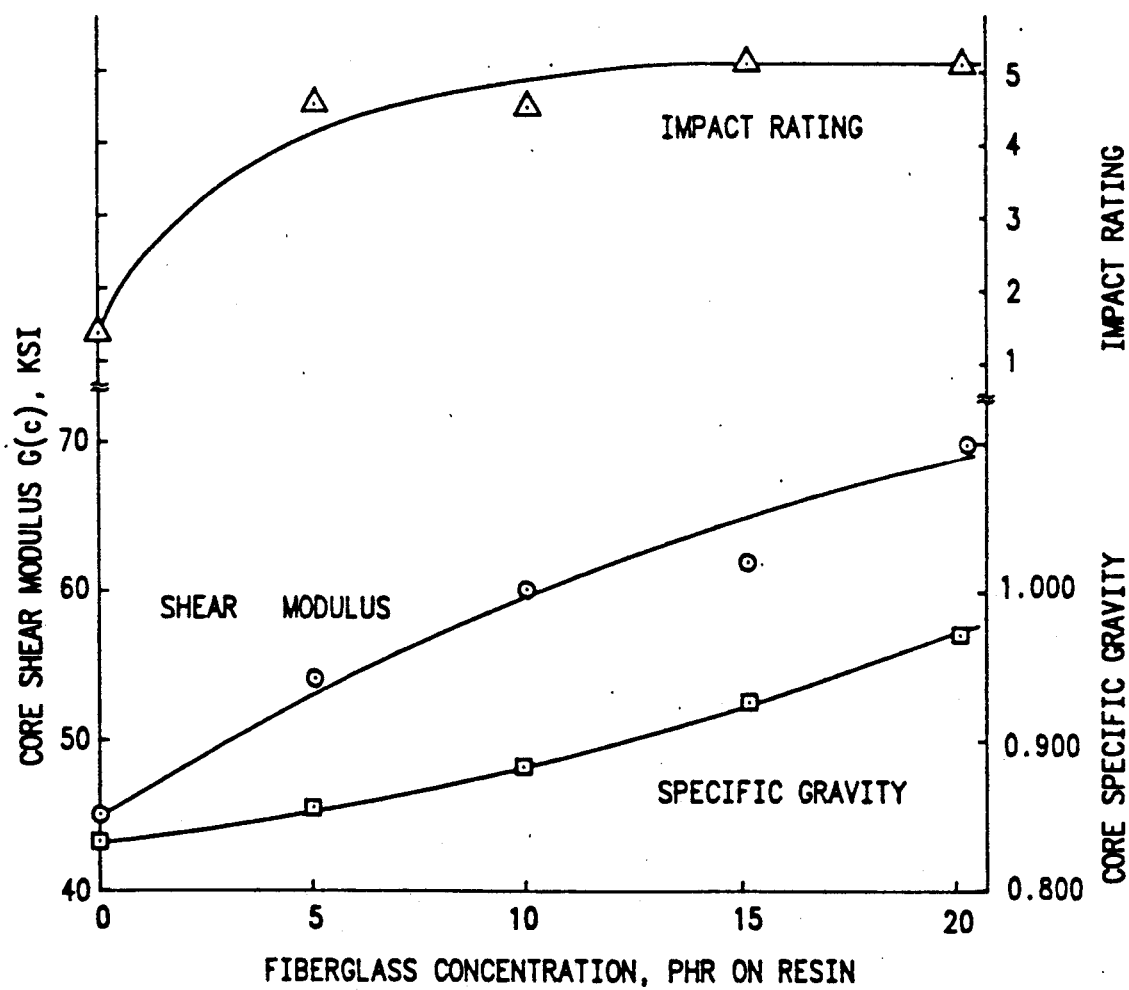
FIG. 6 shows in graphic form some of the data of Example V, Table V.

Laminates were prepared from 6×12-in. (152×305 mm) sheets of phosphoric acid-anodized aluminum by a procedure similar to that in Example I. The core mixtures were based on a vinyl ester and an orthophthalic polyester resin as indicated in Table V. In one series, chopped fiberglass was incorporated in concentrations from zero to 20 phr in a resin mixture containing 10 phr Dicaperl HP 510 glass microballoons. The results are listed in Table V and plotted in FIG. 6. It can be seen that in the absence of any fiber reinforcement, laminate rigidity was low, and the core failed the falling ball impact test. With increasing levels of reinforcement, rigidity and impact resistance rose noticeably. Core density also rose with increasing fiberglass concentration, of course.

In another series with a somewhat different resin and microballoon grade, 10 phr fiberglass was compared with 5 phr cut Aramid fiber and 5 phr cut graphite fiber. As the results in Table V show, both of the latter fibers yielded acceptable, albeit somewhat less rigid laminates than the higher concentrations of glass.

EXAMPLE VI

Effect of Resin Selection on Laminate Properties

With respect to the selection of resins for structural laminates, I have used primarily unsaturated polyesters and vinyl esters for the above Examples. Although a number of different resin types are effective for the cores of the present invention structural laminates, unsaturated polyesters and vinyl esters are of special interest because of their relatively low viscosity, good compatibility with fillers and reinforcing agents, controllable cure over a wide range of temperatures, and low to moderate cost. Additional resin types also investigated included epoxies, polyester-polyurethane hybrids, polyurethanes and others.

Following procedures similar to that described in Example I; the resins in this Example were mixed with initiator/curing agent, Dicaperl HP 210 microballoons and fiberglass as indicated in Table VIa, and used for the preparation of metal-faced laminates. The metal facings were phosphoric acid-anodized aluminum. The laminates were generally cured for 2 hours at 212° F. Representative pane compositions and performance test results are summarized in Table VIa. Resin suppliers and curing agents or catalysts are listed in Table VIb.

TABLE V

Effect of Fiber Reinforcement on Laminate Properties

| | Panel composition | | | | | | | | |
|---|---|---|---|---|---|---|---|---|---|
| | Facing | | | Core (a) | | | | Panel | Basis | Core |
| Sample | Thickness in. | Alloy | Resin | Fiber reinforcement | | Filler | | thickness in. | weight lb./sq. ft | specific gravity |
| | | | | Type (b) | phr | Grade | phr | | | |
| V-1 | 0.050 | 5052-H32 | D8084 | Glass CR352 | 10 | HP 210 | 5 | 0.336 | 2.62 | 0.959 |
| V-2 | " | " | " | Graphite | 5 | " | | 0.348 | 2.72 | 0.994 |
| V-3 | " | " | " | Aramid | 5 | " | | 0.343 | 2.57 | 0.893 |
| V-4 | 0.047 | 5052-H34 | Blend B | Glass CL292 | 0 | HP 510 | 10 | 0.268 | 2.17 | 0.820 |
| V-5 | " | " | " | " | 5 | " | " | 0.345 | 2.53 | 0.853 |
| V-6 | " | " | " | " | 10 | " | " | 0.340 | 2.54 | 0.879 |
| V-7 | " | " | " | " | 15 | " | " | 0.325 | 2.52 | 0.924 |
| V-8 | " | " | " | " | 20 | " | " | 0.345 | 2.68 | 0.969 |

| | 3-Point bending test | | | | | Impact resistance | |
|---|---|---|---|---|---|---|---|
| Sample | Deflection force m lb./in. | Maximum deflection in. | Core shear modulus ksi | Flexural modulus ksi | Rigidity index | Rating | Deflection in. |
| V-1 | 4340 | >0.275 | 61 | 4768 | 4940 | 5.0 | 0.05 |
| V-2 | 5000 | >0.275 | 76 | 4935 | 5720 | 5.0 | 0.08 |
| V-3 | 4765 | >0.275 | 71 | 4909 | 5400 | 5.0 | 0.10 |
| V-4 | 2500 | >0.275 | 45 | 5403 | 4300 | 1.5 | 0.20 |
| V-5 | 4400 | >0.275 | 54 | 4457 | 5050 | 4.5 | 0.11 |
| V-6 | 4425 | >0.275 | 60 | 4681 | 5120 | 4.5 | 0.09 |
| V-7 | 4095 | >0.275 | 62 | 4964 | 5000 | 5.0 | 0.10 |
| V-8 | 4800 | >0.275 | 70 | 4863 | 5200 | 5.0 | 0.10 |

(a) Resins were Derakane 8084 and Blend B, with the composition given in Table IVa.
(b) Fiber reinforcements:
Graphite from Hexcel 716 hybrid fabric, cut to 0.5 in. length.
Aramid from Hexcel 281 Kevlar ™ 49 Fabric, cut to 0.5 in. length.
Glass - Owens-Corning Fiberglas CR 352-211 roving cut to 0.5 in., and Certainteed CL 292-207 roving cut to 0.75 in. length.

As can be seen from the results, only some of the many tested polyester and vinyl ester resins were effective for high performance structural panels, but could be used in less demanding applications. The majority of resins gave panels that either delaminated or cracked in the falling ball impact test or 3-point bending stiffness test, or that were not sufficiently rigid in the latter test. In other words, such resins displayed insufficient bonding to the anodized metal and/or were too brittle. Some resins bonded well but were too soft.

The difficulty in selecting suitable resins for particular uses of the laminates of this invention reflects primarily the conflicting requirements for strong adhesion to metal and impact resistance, which is generally enhanced by resin toughness and some degree of flexibility, and for rigidity, which is usually also accompanied by brittleness. These competing and conflicting requirements for resin performance and properties are not unlike those encountered in formulating resin systems for other uses, such as protective and decorative resin coatings, resin castings, etc. It has not been possible to predict the performance in the laminates of this invention of a given resin from published resin data, which are generally limited to tensile strength, tensile modulus, elongation at yield and flexural strength and modulus of the neat cured resin or of resin reinforced with one or two levels of a specific fiber. The limited data that have been published for the resins evaluated here are listed in Table VIa.

In some cases, brittleness and poor bonding (as with Koppers 1063-5 orthophthalic polyester) could be overcome by blending with a more flexible, tougher resin such as Dow Derakane 8084 vinyl ester. In most other cases, however, blending of a brittle resin with a more flexible resin did not yield an acceptable high performance structural laminate product, nor did addition of isoprene, a flexibilizing comonomer, under the same relatively mild curing conditions. When the cure time at 100° C. was increased to 5 hours, however, the laminate did show acceptable rigidity as well as impact resistance.

Several tests, not shown in the Tables, confirmed that resin systems such as blend B used with MEKP catalyst gave nearly as good laminate properties after ambient-temperature cure (64°-69° F.) for a week than after the usual 2-hour cure at 212° F.

The epoxy resins that were evaluated were based on Reichhold Epotuf 37-139, a purified form of the most basic epoxy resin, the diglycidyl ether of Bisphenol-A. As the results in Table VIa indicate, the resin failed the impact test when cured with tetraethylene triamine. It performed only slightly better when cured with a type of polyamide commonly used in adhesive applications. But, when blended with Dow DER 732, a more flexible epoxy resin, the laminate displayed good impact resistance. As the results show, however, the improvement in toughness was accompanied by some reduction in core shear modulus and rigidity.

Another interesting resin type was Dow Spectrim TM 354, a polyurethane used commercially for reaction injection molding. This system consisted of MM 354 A isocyanate and MM 383 B polyol. The catalyst was 0.05 phr Dabco 33 triethylenediamine, which gave a gel time of 20 minutes for the filled, reinforced mixture at 55° F. Although this system appeared to have cured significantly in 1 hour at 70° F., the assembled laminate was subjected to a similar 2-hour post-cure at 212° F. as all the other resins. Due to absorption of some atmospheric moisture during hand mixing in an open vessel, some carbon dioxide was produced. The foam that was produced made it necessary to reduce the add-on of HP 210 glass microballoons to 3 phr. Also, to maintain core shear modulus, the fiberglass add-on had to be raised from 10 to 15 phr. With these changes, the resulting laminate performed acceptably.

Another group of resins offering some of the processing and performance characteristics of unsaturated polyesters as well as of polyurethanes are the so-called polyester-urethane hybrids. Two Amoco Xycon (TM) two-component systems were tested and found to perform quite well. The systems consisted of a polyisocyanate (A component) and a solution of an unsaturated polyester polyol in styrene (B component). The A and B components, which already contained a proprietary catalyst, were mixed in the weight ratios recommended by the manufacturer. Microballoons and fiberglass were subsequently mixed in as in the other preparations herein. The final resin mixtures had gel times of 15–25 min. at 60° F. Most of the assembled laminates were cured for two hours at 212° F. One laminate was allowed to cure at ambient temperature (64°–68° F.) for one week. The resulting laminates generally performed well. Data for a laminate cured at 212° F. are shown in Table VIa. The laminate possessed good rigidity and did not crack or delaminate in the falling ball impact test.

Although aluminum-faced laminates are not considered to present any significant flammability hazard, enhanced flame retardance of the core may be desirable in some applications. A laminate was therefore prepared from a commercial brominated vinyl ester (Hetron FR 992) to which 3 phr antimony oxide had been added as recommended by the supplier. As the results in Table VIa indicate, the laminate did not pass the impact test but displayed adequate rigidity. Flammability was compared using 1×6 in. (25×152 mm) strips of laminate in horizontal and vertical burn tests similar to UL 94 (Underwriters Laboratories). A non-flame-retarded laminate (sample VI-8, based on resin Blend B) barely supported combustion after about 60 seconds' exposure to the burner flame, but self-extinguished immediately after the ignition source was removed. The flame-retarded laminate (sample VI-24), on the other hand, did not even appear to support combustion. The relatively high thermal conductivity of the aluminum facings clearly kept temperatures in the combustion zone below the level required to sustain the combustion even of the non-flame-retarded laminate.

The performance of particular resins in the laminate of this invention is somewhat unpredictable, as indicated above. As in other applications requiring materials with complex combinations of properties, the effectivess of candidate resins will have to be determined experimentally, that is, by preparing laminates and subjecting them to the above-mentioned and other appropriate performance tests to determine which resin or resin system gives the desired performance characteristics and properties according to this invention. However, the lap shear test described herein provides a predictable method of predicting resin performance in the resin to metal bond property, without having to construct and test the entire laminate.

TABLE VIa

Performance of Resins in Laminates (a)

| | | | | Neat cured resin properties | | | | Laminate properties | |
|---|---|---|---|---|---|---|---|---|---|
| | Resin (b) | | Curing agent or catalyst | Measured lap shear psi | Published | | | Filler in core phr | Facing thickness in. | Panel thickness in. |
| Sample | Grade | Type | | | Tensile ksi | Elongation % | Flex. mod. ksi | | | |

| Sample | Grade | Type | Curing agent or catalyst | Measured lap shear psi | Tensile ksi | Elongation % | Flex. mod. ksi | Filler in core phr | Facing thickness in. | Panel thickness in. |
|---|---|---|---|---|---|---|---|---|---|---|
| Preferred resins for structural laminates | | | | | | | | | | |
| VI-1 | D8084 | VE | MEKP | 2540 | 10 | 10 | 550 | 5 | 0.047 | 0.303 |
| VI-2 | " | | " | | | | | 4 | 0.050 | 0.319 |
| VI-3 | Spectrim 354A/383B | PU | TEDA | 2240 | NA | NA | NA | 2 | 0.051 | 0.343 |
| VI-4 | R37-139/DER732 75:25w | Epoxy | PA | 2200 | NA | NA | NA | 4 | 0.050 | 0.346 |
| VI-5 | Xycon HX21107 | Hybrid | Peroxide | 2110 | NA | NA | NA | 12 | 0.047 | 0.351 |
| VI-6 | " | | | | | | | 5 | 0.050 | 0.340 |
| VI-7 | R37-139/DER732 83:17w | Epoxy | TETA | 2020 | NA | NA | NA | 4 | 0.050 | 0.308 |
| VI-8 | D8084/K1063-5 50:50w | VE/OP | MEKP | 1940 | NA | NA | NA | 5 | 0.047 | 0.315 |
| VI-9 | " | | " | | | | | 5 | 0.051 | 0.320 |
| VI-10 | K6908 | IP | " | 1680 | NA | 2 | NA | 4 | 0.050 | 0.325 |
| VI-11 | K6641T | IP | " | 1610 | 10 | 2 | 540 | 5 | 0.050 | 0.329 |
| Less effective resins for structural laminates (c) | | | | | | | | | | |
| VI-12 | RE37-139 | Epoxy | PA | 1990 | NA | NA | NA | 4 | 0.050 | 0.327 |
| VI-13 | TAP Isophthalic | IP | MEKP | 1750 | NA | NA | NA | 3 | 0.050 | 0.315 |
| VI-14 | K7000A | BPA | " | 1650 | 8.5 | 4 | 420 | 8 | 0.050 | 0.303 |
| VI-15 | D411-45 | VE | " | 1615 | 11 | 5 | 450 | 5 | 0.047 | 0.322 |
| VI-16 | R33-072/K87-186 75:25 | OP/IP | " | 1490 | NA | NA | NA | 8 | 0.050 | 0.307 |
| VI-17 | K87-186/K1063-5 25:75 | IP/OP | " | 1480 | NA | NA | NA | 5 | 0.050 | 0.303 |
| VI-18 | K6631T | IP | " | 1450 | 9 | 2 | 520 | 5 | 0.050 | 0.320 |
| VI-19 | K1211-5 | OP | " | 1310 | 2 | 55 | NA | 8 | 0.050 | 0.317 |
| VI-20 | K3102-5 | OP | " | 1310 | 5 | 7 | 200 | 8 | 0.050 | 0.325 |
| VI-21 | K87-186 | IP | " | 1270 | NA | 50 | NA | 5 | 0.050 | 0.310 |
| VI-22 | HET 700 | BPA | " | 1100 | NA | 2 | NA | 5 | 0.047 | 0.307 |
| VI-23 | K1063-5 + 10 phr isoprene | OP | " | 1085 | NA | NA | NA | 5 | 0.051 | 0.336 |
| VI-24 | HET FR992 | VE | " | 1060 | 12 | 5 | 540 | 5 | 0.051 | 0.315 |
| VI-25 | K6246 | IP | " | 1045 | 11 | 4 | 460 | 4 | 0.050 | 0.298 |
| VI-26 | K1063-5 | OP | " | 1020 | 9 | 2 | 640 | 3 | 0.051 | 0.303 |
| VI-27 | R33-072 | OP | " | 940 | 5.3 | 1 | 600 | 8 | 0.050 | 0.313 |

Laminate properties

| Sample | Basis weight lb./sq. ft | Core specific gravity | Deflection force m lb./in. | Maximum deflection in. | Core shear modulus ksi | Flexural modulus ksi | Rigidity index | Impact resistance rating |
|---|---|---|---|---|---|---|---|---|
| Preferred resins for structural laminates | | | | | | | | |
| VI-1 | 2.31 | 0.874 | 3428 | >0.275 | 58 | 5127 | 4908 | 5 |
| VI-2 | 2.45 | 0.884 | 4000 | >0.275 | 64 | 5126 | 5120 | 5 |
| VI-3 | 2.46 | 0.793 | 4083 | >0.275 | 45 | 4209 | 4830 | 5 |
| VI-4 | 2.51 | 0.833 | 4051 | >0.275 | 43 | 4069 | 4671 | 5 |
| VI-5 | 2.46 | 0.830 | 4500 | >0.275 | 56 | 4329 | 5202 | 5 |
| VI-6 | 2.68 | 0.989 | 4166 | >0.275 | 50 | 4410 | 4579 | 5 |
| VI-7 | 2.53 | 1.009 | 3484 | >0.275 | 52 | 4962 | 4466 | 5 |
| VI-8 | 2.39 | 0.896 | 4000 | >0.275 | 76 | 5324 | 5324 | 5 |
| VI-9 | 2.58 | 0.980 | 4308 | >0.275 | 78 | 5469 | 5215 | 5 |
| VI-10 | 2.68 | 1.055 | 4000 | >0.275 | 57 | 4847 | 4598 | 5 |
| VI-11 | 2.50 | 0.890 | 4166 | >0.275 | 60 | 4867 | 5062 | 5 |
| Less effective resins for structural laminates (c) | | | | | | | | |
| VI-12 | 2.42 | 0.831 | 4000 | >0.275 | 55 | 4759 | 5050 | 4 |
| VI-13 | 2.73 | 1.156 | 1960 | >0.275 | 15 | 2610 | 2276 | 5 |
| VI-14 | 2.14 | 0.663 | 3218 | >0.275 | 46 | 4813 | 4960 | 1 |
| VI-15 | 2.51 | 0.971 | 4354 | >0.275 | 89 | 5426 | 5394 | 4 |
| VI-16 | 2.42 | 0.906 | 4000 | 0.231 | 84 | 5751 | 5391 | 0 |
| VI-17 | 2.48 | 0.984 | 3703 | >0.275 | 70 | 5539 | 4928 | 2 |
| VI-18 | 2.46 | 0.894 | 3571 | >0.275 | 45 | 4534 | 4528 | 2 |
| VI-19 | 2.32 | 0.775 | 1545 | >0.275 | 10 | 2018 | 2104 | 5 |
| VI-20 | 2.29 | 0.730 | 3454 | 0.071 | 39 | 4186 | 4631 | 2 |
| VI-21 | 2.45 | 0.927 | 3030 | >0.275 | 35 | 4231 | 3984 | 5 |
| VI-22 | 2.41 | 0.949 | 3790 | 0.260 | 76 | 5446 | 5128 | 2 |
| VI-23 | 2.74 | 1.043 | 2143 | >0.275 | 15 | 2350 | 2327 | 5 |
| VI-24 | 2.51 | 0.936 | 4032 | >0.275 | 70 | 5367 | 5106 | 4 |
| VI-25 | 2.46 | 0.993 | 3400 | >0.275 | 59 | 5344 | 4629 | 0 |
| VI-26 | 2.64 | 1.118 | 3850 | >0.275 | 106 | 6188 | 5174 | 3 |
| VI-27 | 2.48 | 0.933 | 4036 | >0.275 | 75 | 5476 | 5210 | 0 |

(a) Details in Example VI. All core compositions were reinforced with 10 phr CR 352 or CL 292 chopped fiberglass, except sample VI-3, which contained 15 phr.
(b) Resin sources and initiator systems are listed in Table VIb.
(c) When used in similar formulations as preferred resins.

TABLE VIb

Resins Used in Laminate Cores (a)

| Sample | Resin Grade | Resin Type | Resin supplier | Curing agent or catalyst Type (b) | phr | Cobalt (c) 6% sol'n. phr | Dimethyl aniline (DMA), phr |
|---|---|---|---|---|---|---|---|
| VI-1 | Derakane ™ 8084 | VE | Dow Chemical Co. | MEKP | 1.75 | 0.4 | 0.05 |
| VI-3 | Spectrim ™ 354A/383B | PU | " | TEDA | 0.05 | — | — |
| VI-4 | R37-139/DER732 75:25w | Epoxy | See VI-12 & VI-28 | PA | 50 | — | — |
| VI-5 | Xycon HX21107 | Hybrid | Amoco Chemical Co. | Peroxide | (e) | — | — |
| VI-7 | R37-139/DER732 83:17w | Epoxy | See VI-12 & VI-29 | TETA | 14 | — | — |
| VI-8 | D8084/K1063-5 50:50w | VE/OP | See VI-1 & VI-18 | MEKP | 1.60 | 0.2 | 0.02 |
| VI-10 | Polyester resin 6908 | IP | Koppers Co. | " | 1.25 | — | — |
| VI-11 | Polyester resin 6641T | IP | " | " | 1.50 | — | — |
| VI-12 | RE37-139 | Epoxy | Reichhold Chemicals, Inc. | PA | 50 | — | — |
| VI-13 | TAP Isophthalic | IP | TAP Plastics, Inc. | MEKP | 1.50 | — | — |
| VI-14 | K7000A | BPA | Koppers Co. | " | 1.50 | — | — |
| VI-15 | D411-45 | VE | Dow Chemical Co. | " | 1.70 | 0.4 | 0.05 |
| VI-16 | R33-072/K87-186 75:25 | OP/IP | See VI-27 & VI-21 | " | 1.50 | — | — |
| VI-17 | K87-186/K1063-5 25:75 | IP/OP | See VI-21 & VI-26 | " | 1.50 | — | — |
| VI-18 | Polyester resin 6631T | OP | Koppers Co. | " | 1.50 | — | — |
| VI-19 | Polyester resin 1211-5 | IP | " | " | 1.50 | — | — |
| VI-20 | Polyester resin 3102-5 | OP | " | " | 1.50 | — | — |
| VI-21 | Polyester resin 87-186 | OP | " | " | 1.50 | 0.3 | — |
| VI-22 | Hetron ™ 700 | IP | Ashland Chemical Co. | " | 1.50 | — | — |
| VI-23 | K1063-5 + 10 phr isoprene | OP | See VI-26 | " | 1.50 | — | — |
| VI-24 | Hetron FR 992 | BPA | Ashland Chemical Co. | " | 1.50 | 0.4 | — |
| VI-25 | Polyester resin 6246 | VE | Koppers Co. | " | 1.50 | 0.3 | 0.05 |
| VI-26 | Polyester resin 1063-5 | IP | Koppers Co. | " | 1.50 | 0.4 | — |
| VI-27 | Polylite ™ 33-072 | OP | Reichhold Chemicals, Inc. | " | 1.50 | 0.3 | 0.05 |
| VI-28 | Polyester resin B 608-84 | OP | Koppers Co. | " | 1.50 | — | — |
| VI-29 | D.E.R. 732 | Epoxy | Dow Chemical Co. | — | — | — | — |

(a) Core mixtures consisted of resin, curing agent/catalyst, cobalt and DMA as indicated in Tables VIa and VIb.
(b) MEKP = methyl ethyl ketone peroxide (9% active oxygen); TEDA = triethylene diamine (Air Products Dabco 33LV) TETA = triethylene tetramine (Pacific Anchor TETA); PA = polyamide (Pacific Anchor Ancamide 400).
(c) Cobalt naphthenate solution.
(d) With 3% antimony oxide added to core mixture for increased fire retardance
(e) Proprietary peroxide incorporated in resin by supplier; none added in present work.

EXAMPLE VII

Laminate from Pre-Formed Cores

Although it is more convenient and more economical to prepare the present laminates from liquid core resins that are cured in situ, the laminates of this invention can also be fabricated by bonding active metal facings to preformed cores with an adhesive.

Thus 1×6 in. strips of the cured core from a panel that had delaminated (sample III-8, listed in Table III above) was sanded, wiped with trichloroethylene and bonded to phosphoric acid-anodized aluminum facings with an epoxy resin blend known to give an acceptable structural laminate. The assembled laminate was cured for 2 hours at 212° F. under moderate pressure. As indicated in Table VII, the laminate had good impact resistance and displayed excellent rigidity.

Also tested were laminates in which the preformed core was plywood and nylon 66. In the case of the plywood, the bonding resin was a vinyl ester. The cured 6×12-in. laminate displayed good metal-core bonding but failed in the impact as well as in the 3-point bending stiffness test due to interply delamination within the plywood. The core shear modulus obtained from the 3-point bending stiffness test was low, in the range expected from data previously published for plywood (cf. R. C. Mitzner, P. W. Post and G. A. Ziegler, "Plywood Overlaid With Metal", Publication C235, American Plywood Association, Tacoma, Wash. (1979)).

The nylon-cored laminate was prepared by placing a trichloroethylene-wiped 1×6 in. strip of nylon 66 between two strips of phosphoric acid-anodized aluminum, wrapping the assembly with aluminum foil to prevent the softened nylon from deforming excessively, and heating the assembly under light pressure to incipient melting at 520° F. After cooling and conditioning at 68° F. and 50% relative humidity for 2 days (which was probably too short for the sample to come to equilibrium), the laminate was tested. As shown in Table VII, bending stiffness was fair; the calculated core shear modulus was slightly below the minimum value acceptable for trailer panels. Since water is known to be a plasticizer for nylon, it is expected that with longer conditioning at this humidity the shear modulus would have been lower. At higher humidities, even lower stiffness would be likely. Thus, this laminate normally would be suitable only for less demanding structural uses or other uses and for use where humidity would not present a problem. Because of the higher density of nylon, the very high processing temperatures required (even if the laminate were prepared from freshly extruded, molding-grade nylon pellets), and the relatively high cost of the resin, nylon 66 is less preferred for the present laminates than the liquid thermosetting resins mentioned earlier.

TABLE VII

Properties of Laminates from Pre-Formed Cores

| | Panel composition | | | | Resin used | | | |
|---|---|---|---|---|---|---|---|---|
| Sample | Facing Thickness & alloy | Pre-formed core Material (a) | Fiberglass | Filler | to bond facings to core (b) | Panel thickness in. | Weight lb./sq. ft | Core specific gravity |
| VII-1 | 0.050 in. | Plywood (c) | None | None | D8084 | 0.343 | 2.23 | 0.625 |

TABLE VII-continued

| | | Properties of Laminates from Pre-Formed Cores | | | | | | |
|---|---|---|---|---|---|---|---|---|
| VII-2 | 5052-H32 0.047 in. 5052-H34 | (APA grade A-A) Resin blend B (from III-8) | 10 phr CR 352 | 10 phr HP210 | Epoxy C | 0.303 | 2.49 | 1.045 |
| VII-3 | 0.047 in. 5052-H34 | Nylon 66 sheet (d) | None | None | None (d) | 0.341 | 2.84 | 1.152 |

| | 3-Point bending test | | | | | Impact resistance | |
|---|---|---|---|---|---|---|---|
| Sample | Deflection force m lb./in. | Maximum deflection in. | Core shear modulus ksi | Flexural modulus ksi | Rigidity index | Rating | Deflection in. |
| VII-1 | 2430 | 0.150 | 18 | 2514 | 3185 | 3 | 0.10 |
| VII-2 | 3835 | >0.275 | 89 | 5732 | 5080 | 5 | 0.05 |
| VII-3 | 3670 | >0.275 | 39 | 3847 | 3790 | 5 | 0.13 |

(a) Blend B with composition listed in Table IVa.
(b) D8084: Derakane 8084 vinyl ester. Epoxy C: Blend of Epotuf 37-139 (Reichhold) and DER 732 (Dow) epoxy resins in 75:25 weight ratio, with 50 phr Ancamide 400 polyamide as curing agent.
(c) Plywood - APA Grade A-A, 0.25 in. thick, bonded to facings with resin free of fillers or reinforcements.
(d) Bonded by heating assembled sandwich to 520 F. for 6 min., until nylon began to melt.

EXAMPLE VIII

Laminate Panel Joints

In some instances, such as in truck trailer assembly, it is desirable to join several laminate panels of this invention so as to produce a larger continuous panel. A convenient and effective method involves the use of laminate panels in which the core is recessed as shown in top view FIG. 7. The depth of the recess can vary, but in the case of trailer panels a practical depth is 1.5 in.(38 mm). The thickness of the facings 71 is about 0.05 in. and that of the core 72 typically 0.21 in. (5.3 mm), resulting in an overall panel thickness of about 0.31 in. (7.9 mm). The recess is obtained by fabricating the laminate panels with removable edge spacers as described in Example I. A panel of this type is typically 4×9 ft. (1219×2772 mm) in size.

Figure 7:
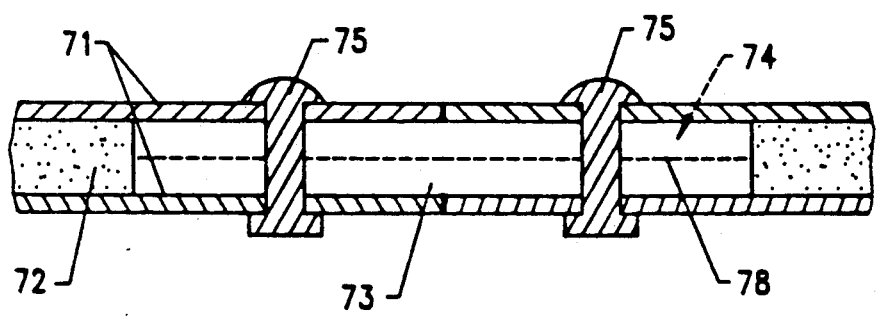
FIG. 7 shows a cross section view of a joint formed to join two panels.
Figure 8A:
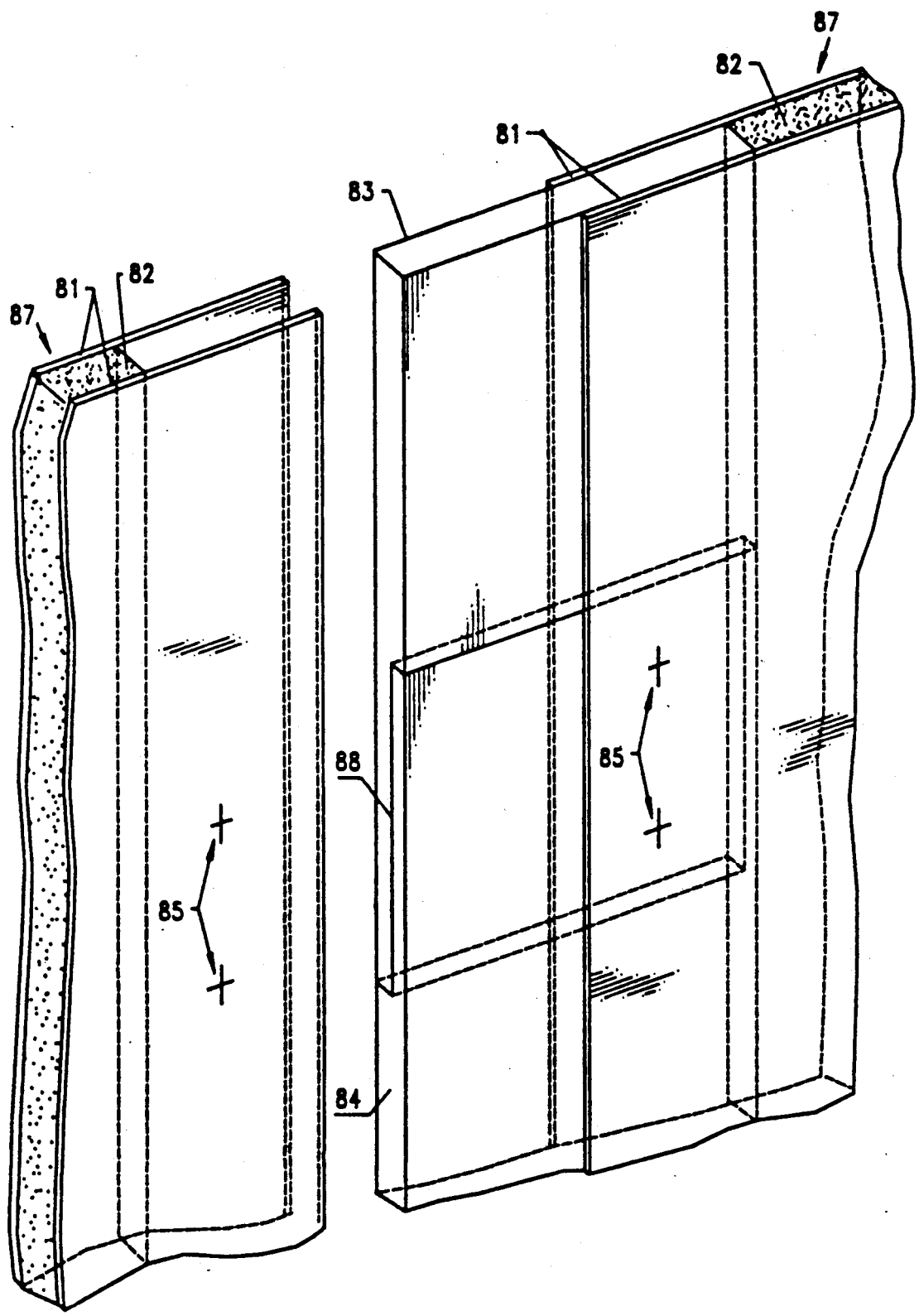
FIG. 8a shows a perspective view of a composite panel joint assembly.
Figure 8B:
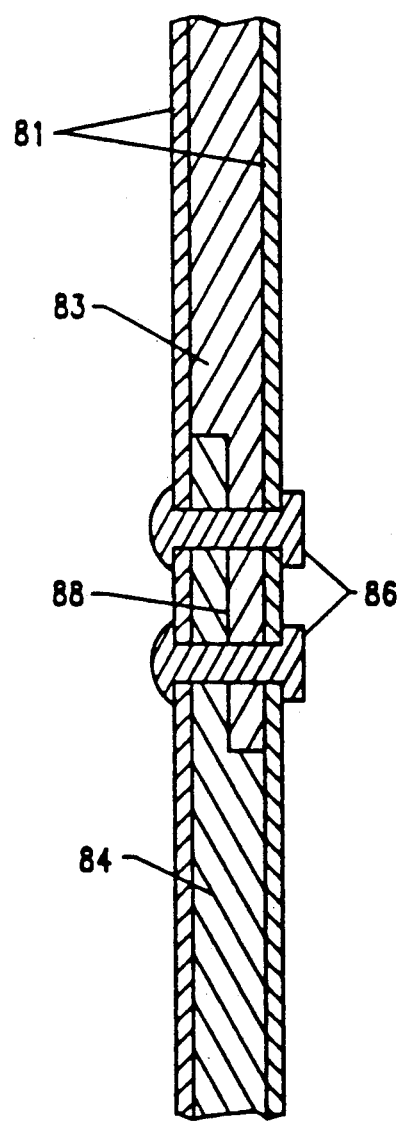
FIG. 8b shows a cross section end view of the rivet placement in the joint assembly of FIG. 8b.

Panels with such recessed cores are joined through a solid metal inserts 73 and 74 having the same thickness as the laminate core. The panels may be joined with a single internal splice section between the panels, but an alternative embodiment useful in some instances such as for repairs, is as shown in FIGS. 7 and 8 where the internal splice section is in two or more overlapping parts, such as 73 and 74. Dashed line 78 is the hidden overlap seam of the internal splice sections 73 and 74. The width of the joining strip or splice is equal to the sum of the recess depths of the two panels, i.e. 3 in. in the case of the trailer panels mentioned above. The laminate panels are fastened to the joining strip with rivets 75. In the case of trailer panels, two rows of ¼-in. rivets (one row on each side of the joint), with the rivets about 2 in. apart in a given row, represents an effective arrangement. A suitable material for the joining strip in such a case would be aluminum 6061-T6 alloy, which is widely used because of its extrudability and strength. Instead of conventional rivets other types of mechanical fasteners may also be used.

Although in principle a trailer side wall could be made from a single large laminate panel (coils of aluminum sheet up to about 12 ft. in width are commercially available), continuous or batch fabrication and shipment of 4 or 5-ft. wide panels is considerably less cumbersome. Even more important is the superior repairability of such panel sections when they are joined to an internal splice with rivets or other similar mechanical fasteners. In case of severe damage, an affected panel is readily replaced by drilling out the rivets joining that panel to other panels and/or to the trailer frame, and withdrawing the internal solid metal splices on both sides by pulling them upwards. If the available headroom is inadequate, a portion of the damaged panel must be cut out so that the internal splices can be withdrawn sideways.

After replacement of the damaged panel with a new panel, the internal solid metal splices are reinserted from the top. If there is inadequate headroom above the trailer, a sectioned splice is used. A preferred design that has been tested involves internal splice sections connected through one or more lap joints as shown in perspective view FIG. 8a. Two panels 86 and 87 are aligned with the edge slots formed by the facings 81 and the recessed core 82 facing each other (they are shown separated in FIG. 8a for better visibility). Internal splice sections 83 and 84 are then inserted, and the whole assembly is joined with rivets at points 85 on the lap joint and elsewhere along the internal joining strip. Internal splice sections 83 and 84 overlap at interface 88. Another view of the lap joint, fastened to the panel with rivets 84, is shown in side view cross section FIG. 8b. Short splice sections 83 and 84 thus make possible not only repairs where headroom is limited but can often also be inserted from the bottom of the trailer side wall, simplifying repairs and assembly even further. With properly selected and positioned fasteners, sectioning of the internal joining strip or splice need have no detrimental effects on overall trailer sidewall strength an rigidity.

It can be appreciated that trailer side walls consisting of single, continuous laminate panels will be considerably more difficult to repair without either appreciably increasing the original wall thickness or reducing panel strength or rigidity.

Figure 9A:
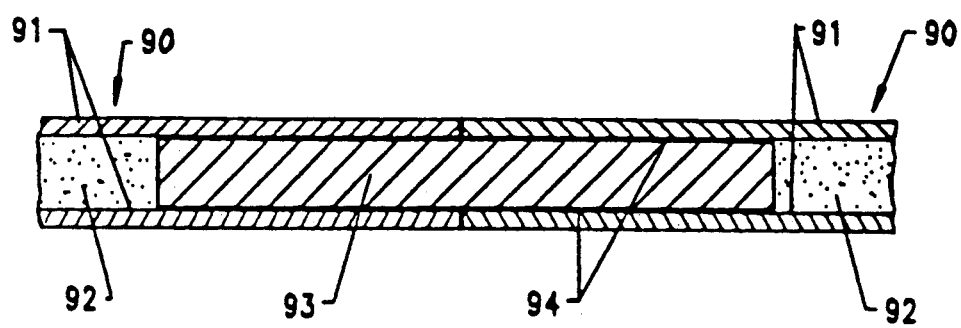
FIG. 9a and 9b are cross section views of adhesive-bonded panel joint assemblies.

It is also possible to bond the laminate panels to the solid internal splice with an adhesive and without the use of mechanical fasteners. As shown in FIG. 9a, panels 90 with a recessed core 92 between facings 91 are bonded to an internal solid metal splice 93 through adhesive layers 94. Such bonded joints must be designed carefully to accommodate the expected stresses under realistic conditions of temperature and humidity. If made of aluminum the internal splice, too, will need to have an active surface produced by a process such as anodizing with phosphoric acid.

Figure 9B:
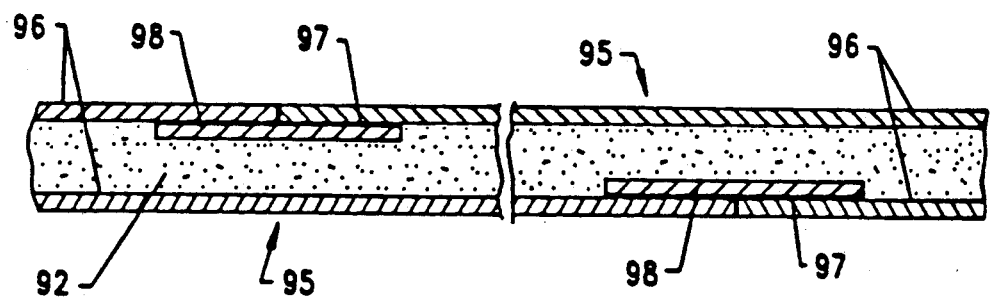

Laminate panels 95 have also been prepared from facing sections joined as shown in FIG. 9b. Facing sections 96 were first bonded with an adhesive 97 (Derakane 8084) to backing strips of aluminum 98, and the adhesive was allowed to cure at ambient temperature. All of the metal had been previously anodized with phosphoric acid. A laminate was then prepared from the joined facings and a resin core 92 as described in previous Examples. Panels fabricated from 0.047 in. thick aluminum in this manner displayed good rigidity and impact strength, provided the backing strips were at least 2.5 in. wide. Here, too, the width of the adhesively bonded areas will depend on the expected stresses. Although this panel design offers low weight and is thinner than panels joined with rivets, repairs of such permanently bonded structures will be more complicated.

Having described this invention in concept and general terms and having illustrated the invention with preferred embodiments and examples thereof, it is to be understood that these embodiments are capable of further variation and modification. Therefore, the present invention is not to be limited to any of the particular details of the embodiments set forth above, but is to be taken with such changes and variations as fall within the purview of the following claims.

I claim:

1. A freight container body comprising at least one panel which is a structural laminate comprising two metal sheets and a thermoset reinforced resin core between and bonded to the two metal sheets, wherein each metal sheet has a thickness between 0.015 inch and about 0.1 inch, the thickness of the laminate is less than about 2 inches, and the panel is characterized by having a rigidity index of at least about 2,000.

2. A freight container body according to claim 1 wherein the laminate is characterized by having a rigidity index of at least about 3000.

3. A freight container body according to claim 1 wherein the metal sheets are aluminum.

4. A freight container body according to claim 1 wherein the resin core comprises microballoons.

5. A freight container body comprising at least one panel which is a structural laminate comprising two metal sheets and a thermoset reinforced resin core between and bonded to the two metal sheets, wherein each metal sheet has a thickness between 0.015 inch and about 0.1 inch, the thickness of the laminate is less than about 2 inches, and the panel is characterized by having a flexural modulus of at least about 2.5 million psi, by having a core thickness at least equal to the combined thickness of the metal sheets, and by having a weight of no more than about 3 lb/ft².

6. A freight container body according to claim 5 wherein the laminate is characterized by having a rigidity index of at least about 3000.

7. A freight container body according to claim 5 wherein the metal sheets are aluminum.

8. A freight container body according to claim 5 wherein the resin core comprises microballoons.

9. A freight container body comprising at least one panel which is a structural laminate comprising two metal sheets and a thermoset reinforced resin core between and bonded to the two metal sheets, wherein each metal sheet has a thickness between 0.015 inch and about 0.1 inch, the thickness of the laminate is less than about 2 inches, and the panel is characterized by having sufficient impact resistance to pass the falling ball impact test with no delamination of the core and metal sheet or cracking of the core, and characterized by having a shear modulus of at least about 25 ksi.

10. A freight container body according to claim 9 wherein the laminate is characterized by having a rigidity index of at least about 3000.

11. A freight container body according to claim 9 wherein the metal sheets are aluminum.

12. A freight container body according to claim 9 wherein the resin core comprises microballoons.

13. A laminate comprising two metal sheets and a reinforced thermoset resin core between and bonded to the metal sheets, wherein each metal sheet has a thickness between about 0.015 inch and about 0.1 inch, the thickness of the laminate is less than about 2 inches, and the thickness of the core is at least equal to the combined thickness of the metal sheets, and wherein the laminate is characterized by having a flexural modulus of at least about 2.5 million psi and by having sufficient impact resistance to pass the falling ball impact test with no delamination of the core and metal sheet and no cracking of the core.

14. A laminate according to claim 13 wherein the flexural modulus is at least about 3 million psi.

15. A laminate according to claim 13 wherein the metal sheets are aluminum.

16. A laminate according to claim 13 wherein the reinforced resin core has a specific gravity less than about 1.25.

17. A laminate according to claim 13 wherein the laminate is characterized by having a rigidity index of at least about 3,000.

18. A laminate according to claim 13 wherein the thickness of the laminate is at least about 0.10 inch.

19. A laminate according to claim 13 wherein the laminate is characterized by having a tensile yield strength of at least about 2,000 lb. per inch in width.

20. A laminate according to claim 19 wherein the tensile yield strength is at least about 2,500 lb./in. width.

21. A laminate according to claim 13 wherein the laminate is characterized by having a core shear modulus of at least about 25 ksi.

22. A laminate according to claim 21 wherein the laminate is characterized by having a rigidity index of at least about 3,000.

23. A laminate comprising two metal sheets and a reinforced thermoset resin core between and bonded to the two metal sheets, wherein each metal sheet has a thickness between 0.015 inch and 0.1 inch, the thickness of the laminate is less than about 2 inches, and the thickness of the core is at least equal to the combined thickness of the metal sheets, and the laminate is characterized by having a rigidity index of at least about 3,000.

24. A laminate according to claim 23 wherein the metal sheets are aluminum.

25. A laminate according to claim 23 wherein the rigidity index is at least about 4,000.

26. A laminate according to claim 23 wherein the rigidity index is at least about 4,500.

27. A laminate according to claim 23 wherein the laminate is characterized by having a core shear modulus of at least about 25 ksi.

28. A laminate according to claim 23 wherein the thickness of the laminate is at least about 0.10 inch.

29. A laminate which comprises two metal sheets and a thermoset resin core between and bonded to the two metal sheets, wherein the metal sheet has a thickness between about 0.040 inch and about 0.070 inch, and wherein the resin core comprises a reinforced thermoset resin and contains a sufficient amount of microballoons to provide a specific gravity of the reinforced resin core is less than about 1.3.

30. A laminate according to claim 29 wherein the metal sheets are aluminum.

31. A laminate comprising two metal sheets and a reinforced thermoset resin core between and bonded to the two metal sheets, wherein each metal sheet has a thickness between 0.015 inch and about 0.1 inch, the thickness of the laminate is less than about 2 inches, and the thickness of the core is at least equal to the combined thickness of the metal sheets, and the laminate is characterized by having a shear modulus of the core of at least about 25 ksi wherein the laminate is characterized by having sufficient impact resistance to pass the falling ball impact test with no delamination of the core and metal sheet or cracking of the core.

32. A laminate according to claim 31 wherein the shear modulus of the core is at least about 33 ksi.

33. A laminate according to claim 31 wherein the core shear modulus is at least about 33 ksi.

34. A laminate according to claim 31 wherein the core shear modulus is at least about 40 ksi.

35. A laminate according to claim 31 wherein the thickness of the laminate is at least about 0.10 inch.

36. A laminate according to claim 31 wherein the metal sheets are aluminum.

37. A laminate according to claim 36 wherein the aluminum surface is anodized with phosphoric acid.

38. An assembly comprising substantially abutting sandwich panels each having recessed cores along the length of each adjacent edge;

an internal splice section, positioned in the two recessed area between the metal sheets of the abutting panels, and extending substantially from the recessed core in the first panel to the recessed core in the second panel; and means for attaching the splice section to a metal sheet of at least two abutting panels and to at least one other splice section overlapping therewith.

39. An assembly according to claim 38 wherein the internal splice section comprises two sections which overlap each other along a line which transverses the adjacent edges of the panels.

40. An assembly according to claim 38 wherein the means for attachment comprises rivets, screws or bolts.

41. An assembly according to claim 38 wherein the means for attachment comprises adhesive means.

42. A laminate comprising two aluminum sheets and a plywood core between and bonded to the aluminum sheets with a thermoset resin wherein the aluminum surface of each sheet is anodized with phosphoric acid or etched with chromic acid or dichromate-sulfuric acid before being bonded to the plywood core.

43. A method of making a laminate comprising placing between two metal sheets having prepared surfaces, a resin composition comprising (a) thermoset resin capable of bonding in neat form to the prepared surfaces of the metal sheets upon curing in neat form to provide a lap shear strength of at least 700 psi, (b) reinforcing material present in an amount between about 3 and about 30 parts by weight based upon the weight of the resin, and (c) microballoons in suspension in the resin present in an amount sufficient to produce the cured reinforced resin composition having a specific gravity less than about 1.3, and curing the resin composition while positioned between and in contact with the two metal sheets.

44. A laminate according to claim 43 wherein the metal sheets are aluminum.

* * * * *

UNITED STATES PATENT AND TRADEMARK OFFICE
CERTIFICATE OF CORRECTION

PATENT NO. : 5,030,488
DATED : July 9, 1991
INVENTOR(S) : Igor Sobolev

It is certified that error appears in the above-identified patent and that said Letters Patent is hereby corrected as shown below:

TITLE PAGE:

In "References Cited", U.S. Patent Documents, "4,601,194" should read --4,601,941--.

In the Abstract, line 6, "provided" should read --provide--.

In Column 1, line 7, delete "a"; line 44, "foamed" should read --reacted--.

In Column 6, line 30, insert a semicolon after the word "construction".

In Column 8, line 26, insert a comma after the word "gun".

In Column 10, line 2, "the" should read --a--; line 31, "contaminates" should read --contaminants--.

In Column 11, line 6, delete the word "resin".

In Column 12, line 64, delete "This lap shear test."

In Column 13, line 1, after the word "could" insert --not--; line 8, delete the word "the"; line 11, delete "in"; line 14, "info" should read --inch--.

UNITED STATES PATENT AND TRADEMARK OFFICE
CERTIFICATE OF CORRECTION

PATENT NO. : 5,030,488

DATED : July 9, 1991

INVENTOR(S) : Igor Sobolev

It is certified that error appears in the above-identified patent and that said Letters Patent is hereby corrected as shown below:

In Column 18, line 30, "on" should read --no--; line 42, "a" should read --the--; line 45, "m" should read --my--.

In Column 22, line 67, insert a period after the numeral "3".

In Column 24, in the heading of Table IVb, "um" should read --$\mu$m--.

In Column 26, line 36, "pane" should read --panel--.

In Column 27, lines 46 and 47, the extra space should be deleted between "cure" and "(64°-69°F)".

In Column 28, line 55, "laminate" should read --laminates--.

In Column 31, line 44, "was" should read --were--.

UNITED STATES PATENT AND TRADEMARK OFFICE
CERTIFICATE OF CORRECTION

PATENT NO.  : 5,030,488
DATED       : July 9, 1991
INVENTOR(S) : Igor Sobolev

It is certified that error appears in the above-identified patent and that said Letters Patent is hereby corrected as shown below:

In Column 33, line 37, delete the word "a".

In Column 37, line 28, "37" should read —38—, and "36" should read —37—;
line 30, "38" should read —39—.

In Column 38, line 6, "39" should read —40—, and "38" should read —39—;
line 10, "40" should read —41—, and "38" should read —39—;
line 12, "41" should read —42—, and "38" should read —39—; and
line 14, "42" should read —37—; and
line 34, "laminate" should read —method—.

Signed and Sealed this

Fourteenth Day of December, 1993

Attest:

BRUCE LEHMAN

*Attesting Officer*     *Commissioner of Patents and Trademarks*